US012649823B2

(12) United States Patent
Chung

(10) Patent No.: US 12,649,823 B2
(45) Date of Patent: Jun. 9, 2026

(54) LIGNIN BASED BIODEGRADABLE POLYMERS AND METHODS OF MAKING THE SAME

(71) Applicant: THE FLORIDA STATE UNIVERSITY RESEARCH FOUNDATION, INC., Tallahassee, FL (US)

(72) Inventor: Hoyong Chung, Tallahassee, FL (US)

(73) Assignee: THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 753 days.

(21) Appl. No.: 17/791,166

(22) PCT Filed: Jan. 7, 2021

(86) PCT No.: PCT/US2021/012442

§ 371 (c)(1),
(2) Date: Jul. 6, 2022

(87) PCT Pub. No.: WO2021/142079

PCT Pub. Date: Jul. 15, 2021

(65) Prior Publication Data

US 2023/0064459 A1 Mar. 2, 2023

Related U.S. Application Data

(60) Provisional application No. 62/958,021, filed on Jan. 7, 2020.

(51) Int. Cl.
*C08G 63/185* (2006.01)
*C08G 63/08* (2006.01)
*C08G 81/00* (2006.01)
*C08L 97/00* (2006.01)

(52) U.S. Cl.
CPC ........... *C08G 63/185* (2013.01); *C08G 63/08* (2013.01); *C08G 81/00* (2013.01); *C08L 97/005* (2013.01); *C08G 2230/00* (2013.01)

(58) Field of Classification Search
CPC .. C08G 18/6492; C08G 63/185; C08G 63/08; C08G 81/00
See application file for complete search history.

(56) References Cited

U.S. PATENT DOCUMENTS

2014/0275435 A1 9/2014 Holmberg et al.
2016/0355535 A1 12/2016 Venditti et al.
2017/0342219 A1 11/2017 Stahl et al.
2019/0071576 A1 3/2019 Schepers et al.
2020/0032007 A1 1/2020 Naskar et al.

FOREIGN PATENT DOCUMENTS

CN 1958636 A 5/2007
DE 19741153 A1 3/1998
EP 3409727 A1 12/2018

OTHER PUBLICATIONS

Guo et al.Polyesters from Lignin. I. The Reaction of Kraft Lignin with Dicarboxylic Acid Chlorides, Polymer International 27 (1992) 11-22, published on Jan. 1992.*
Pascual et al Organocatalyzed Synthesis of Aliphatic Polyesters from Ethylene Brassylate: A Cheap and Renewable Macrolactone, | ACS Macro Lett. 2014, 3, 849-853, published on Aug. 12, 2014.*
Office Action issued for Brazilian Application No. BR112022013487-8, dated Aug. 7, 2024. English Translation. 4 pages.
International Preliminary Search on Patentability, issued for PCT Application No. PCT/US2021/012442 on Mar. 10, 2021. 15 pages.
International Searching Authority (Isa/US). International Search Report and Written Opinion, issued in PCT Application No. PCT/US2021/012442 on Mar. 10, 2021. 15 pages.
Scarica, Carmela, et al. "Lignin functionalized with succinic anhydride as building block for biobased thermosetting polyester coatings." ACS Sustainable Chemistry & Engineering 6.3 (2018): 3392-3401.
Communication pursuant to Article 94(3) EPC issued in European Application No. 21738864.4, dated Aug. 12, 2025, 5 pages.
Extended European Search Report in Application No. 21738864.4 dated Oct. 10, 2023, 14 pages.
Antonsson et al.: "Low Mw-lignin fractions together with vegetable oils as available oligomers for novel paper-coating applications as hydrophobic barrier", Industrial Crops and Products, Elsevier, NL, vol. 27, No. 1, Nov. 28, 2007 (Nov. 28, 2007), pp. 98-103.
Karmakar G. et al: "Chemicals from Vegetable Oils, Fatty Derivatives, and Plant Biomass" In: "Innovative Uses of Agricultural Products and Byproducts", Jan. 1, 2020 (Jan. 1, 2020), American Chemical Society, Washington, DC, vol. 1347, pp. 1-31.
Examination Report issued in Indian Application No. 202227044915, dated Mar. 11, 2025.

* cited by examiner

*Primary Examiner* — Gregory Listvoyb
(74) *Attorney, Agent, or Firm* — Meunier Carlin & Curfman LLC

(57) ABSTRACT

Disclosed are biodegradable polyester polymers comprising lignin-containing segments and vegetable-oil based segments. Also disclosed herein are methods of making biodegradable polyester polymers and the articles made from these polymers.

17 Claims, 13 Drawing Sheets

LIGNIN BASED BIODEGRADABLE POLYMERS AND METHODS OF MAKING THE SAME

CROSS-REFERENCE TO RELATED APPLICATIONS

This application is a national stage application filed under 35 U.S.C. § 371 of PCT/US2021/012442 filed Jan. 7, 2021, which claims the benefit of U.S. Provisional Application No. 62/958,021, filed Jan. 7, 2020, the content of which is incorporated herein by reference in its entirety.

FIELD

The present invention relates generally to lignin based biodegradable polymers that can, for example, be used to replace current petroleum-based plastics and methods for making the same. The present invention also relates to articles comprising the described lignin based biodegradable polymers and methods for the manufacture and use of the same.

BACKGROUND

Plastics became an inseparable part of modern life. The versatility of plastic materials allows tailoring them almost to any possible application. Due to this versatility and continuous use of plastics in everyday life, over 300 million tons of plastic material are produced every year, with about 50% of it for a single use purpose. However, this plastics' durability creates disposal problems, as it takes plastic a long time to decompose, and toxic chemicals can be leached into soil and water. Plastic incineration can also result in the production of harmful gases. Large amounts of plastics are disposed in landfills or dumped into the oceans.

The presence of plastics in oceans creates additional problems as it can complicate navigation, entangle and kill marine life, harbor communities of pathogenic bacteria, and leach harmful chemicals into the environment. The presence of microplastics, very small plastic particles that are nearly ubiquitous in water supplies worldwide, is especially problematic as it makes plastic compounds more bioavailable to animals and humans.

The growing consumer environmental awareness, coupled with the industry's desire to increase cost efficiency while minimizing the damages, demonstrates a need for plastic materials having a desirable cradle-to-cradle product life cycle. For example, there is a need for plastic materials made from renewable sources that can easily degrade within a desirable time without leaching harmful materials. Production of commonly used biodegradable plastics from shelled corn, for example, is not economically efficient, as it requires multi-step processes and competes for human food chain sources. Thus, there is still a need for making biodegradable materials that are economically efficient and can easily be produced from a stable supply of the materials. These needs and other needs are at least partially satisfied by the present invention.

SUMMARY

The present disclosure is generally directed to biodegradable polyester polymers. The biodegradable polyester polymer disclosed herein comprises a) a lignin-containing segment; and b) a vegetable-oil based segment, wherein the lignin-containing segment and the vegetable-oil based segment are linked through ester linkages; and wherein the biodegradable polyester polymer has a linear or a double networked molecular structure.

In further aspects, also disclosed herein is a method of making a biodegradable polyester polymer. The method generally comprises a) providing a functionalized lignin segment comprising carboxylic functional groups; b) providing a vegetable-oil based segment; and c) forming a biodegradable polyester polymer by forming ester linkages between the functionalized lignin segment and the vegetable-oil based segment.

In still further aspects, the functionalized lignin segment comprising carboxylic functional groups is formed by a method comprising: a) providing a lignin having a plurality of hydroxyl groups; and b) selectively oxidizing at least one primary aliphatic hydroxyl group to form at least one carboxylic functional group.

While in still further aspects, the functionalized lignin is formed comprising carboxylic functional groups, is formed by a method comprising: a) providing a lignin having a plurality of hydroxyl groups; and b) non-selectively oxidizing at least one phenol group and/or primary aliphatic hydroxyl group and/or secondary aliphatic hydroxyl group to form at least one carboxylic functional group.

While in still further aspects, disclosed are the methods where the functionalized lignin segment comprising carboxylic functional groups is formed by a method comprising: a) providing a lignin having a plurality of hydroxyl groups; and b) reacting the lignin with a dicarboxylic acid, a derivative of a dicarboxylic acid, or a combination thereof.

Still further, also disclosed herein is an article comprising the disclosed biodegradable polyester polymers.

Additional aspects of the invention will be set forth, in part, in the detailed description, figures, and claims which follow, and in part will be derived from the detailed description or can be learned by practice of the invention. It is to be understood that both the foregoing general description and the following detailed description are exemplary and explanatory only and are not restrictive of the invention as disclosed.

BRIEF DESCRIPTION OF THE FIGURES

FIGS. 2A-2C depict an exemplary schematic of: (FIG. 2A) the functionalization of lignin; (FIG. 2B) forming the dialcohol-containing segment from an exemplary lactone; and (FIG. 2C) the condensation polymerization reaction of the functionalized lignin segment and the dialcohol-containing segment.

FIGS. 3A-3B depict an exemplary photograph of: (FIG. 3A) the modified lignin, and (FIG. 3B) the produced poly (ethylene brassylate).

DETAILED DESCRIPTION

Figure 1:
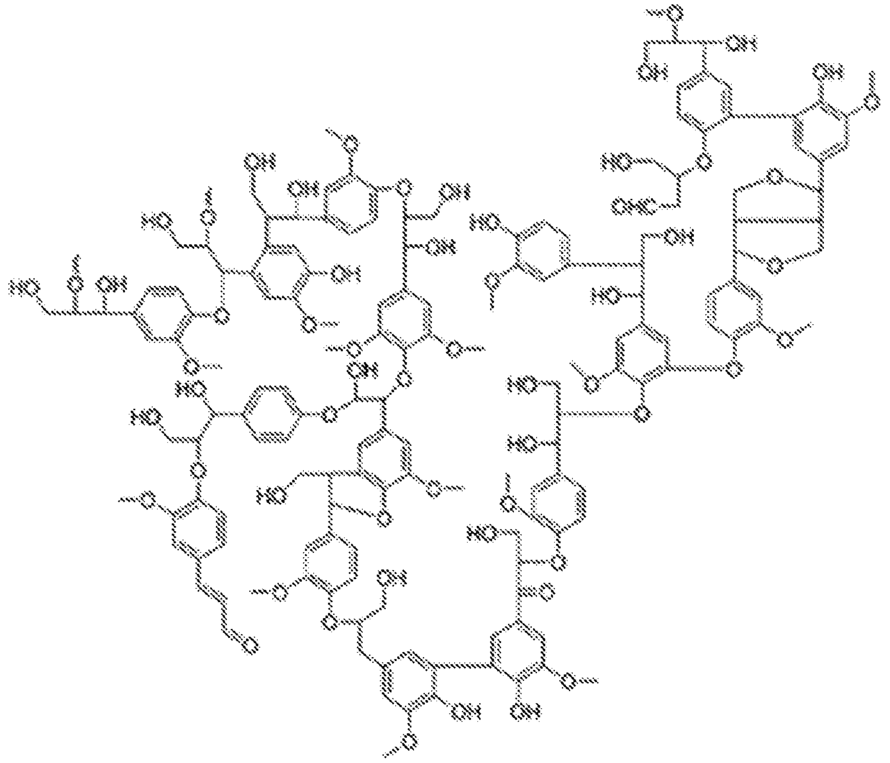
FIG. 1 depicts an exemplary diagram of the chemical structure of lignin.

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

In this specification and in the claims that follow, reference will be made to a number of terms, which shall be defined to have the following meanings:

Throughout the description and claims of this specification, the word "comprise" and other forms of the word, such as "comprising" and "comprises," means including but not limited to, and is not intended to exclude, for example, other additives, segments, integers, or steps. Furthermore, it is to be understood that the terms comprise, comprising and comprises as they related to various aspects, elements and features of the disclosed invention also include the more limited aspects of "consisting essentially of" and "consisting of."

As used herein, the singular forms "a," "an," and "the" include plural referents unless the context clearly dictates otherwise. Thus, for example, reference to a "polymer" includes aspects having two or more such polymers unless the context clearly indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

For the terms "for example" and "such as," and grammatical equivalences thereof, the phrase "and without limitation" is understood to follow unless explicitly stated otherwise.

As used herein, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, segment, composition, or other condition for which substantially is used to characterize or otherwise quantify an amount.

In other aspects, as used herein, the term "substantially free," when used in the context of a composition or segment of a composition that is substantially absent, is intended to refer to an amount that is less than about 1% by weight, e.g., less than about 0.5% by weight, less than about 0.1% by weight, less than about 0.05% by weight, or less than about 0.01% by weight of the stated material, based on the total weight of the composition.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts.

A weight percent of a segment, unless specifically stated to the contrary, is based on the total weight of the formulation or composition in which the segment is included.

As used herein, the term or phrase "effective," "effective amount," or "conditions effective to" refers to such amount or condition that is capable of performing the function or property for which an effective amount or condition is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate, effective amount will be readily determined by one of ordinary skill in the art using only routine experimentation.

As used herein, the term "biodegradable" refers to a material capable of being decomposed by bacteria or other living microorganisms.

As used herein, the term "glass transition temperature" or "$T_g$" means the temperature at which an amorphous material changes from a brittle, vitreous state to a plastic state. It is dependent upon the composition of the material being tested, including moisture content, the extent of annealing, and the pressure exerted on the material. Glass transition temperature may be measured by differential scanning calorimetry, thermomechanical analysis, dynamic mechanical analysis, and the like.

As used herein, "Kraft lignin" refers to a lignin product of the sulfate pulping process. It is understood that Kraft lignin can comprise about 2-3 wt % of sulfur based on the total weight of the Kraft lignin.

As used herein, the terms "modified" and "functionalized" can be used interchangeably.

Methods of Making Biodegradable Polyester Polymer

In some aspects, disclosed herein is a method comprising: a) functionalizing a lignin having terminal hydroxyl groups to form a functionalized lignin segment comprising terminal carboxylic functional groups; b) reacting a vegetable-oil based lactone to form a dialcohol-containing segment; and c) polymerizing the functionalized lignin segment comprising terminal carboxylic functional groups with the formed dialcohol-containing segment to form a biodegradable polyester polymer, wherein the formed biodegradable polyester polymer comprises a lignin-containing segment linked to a vegetable-oil based segment through ester linkages.

In certain aspects, disclosed are the methods of making a biodegradable polyester polymer that can behave as a PET analog for various applications. It is understood that generally, various polyesters can be produced by polycondensation of hydroxyl-carboxylic acid and ring-opening polymerization of lactones. In particular, aliphatic polyesters are important polymers because of their degradability in natural environments. It is understood that there four main degradation mechanisms are possible: hydrolytic degradation (scission of the main chain by water), enzymatic degradation, oxidative degradation, and physical degradation.

A commonly used aliphatic polyester, poly(lactic acid) (PLA), is produced from sugar and/or corn that are important human food supplies. PLA is also naturally brittle, which is not ideal for some of the applications. The current disclosure demonstrates that PET and other polyester-based biodegradable analogs can be prepared using inexpensive and abundant raw materials, such as lignin and vegetable oil.

In certain aspects, the lignin having terminal hydroxyl groups can be obtained from lignin products. Lignin is the second most abundant plant-based biopolymer after cellulose. It is found in all vascular plants, mostly in the cell wall. It is also the second most abundant biopolymer, accounting for 15 to 30% weight % of lignocellulosic biomass. Chemically, lignin is a random polymeric network consisted of methoxylated phenylpropanoid. The repeating units of coumaryl alcohol, coniferyl alcohol, and sinapyl alcohol form three types of segments within lignin: p-hydroxyphenyl (H), guaiacyl (G), and syringyl (S). These materials contain numerous functional groups: aliphatic and phenolic hydroxyl, carboxylic, carbonyl and methoxy group, and covalent linkage.

FIG. 1 shows the chemical structure of lignin. It has a complex three-dimensional structure with various types of functionalities and covalent links. Lignin's important C—O linkages are the β-O-4, α-O-4, and 4-O-5 linkages, and its important C—C linkages are the β-5, 5-5, β-1, and β-13 linkage. Common functional groups in lignin include methoxyl, phenolic hydroxyl, aliphatic hydroxyl and other carbonyl groups.

Lignin is also a highly stable material due to the presence of densely packed aromatic groups and high molecular weight. Without wishing to be bound by any theory, it is hypothesized that these aromatic groups can provide mechanical strength to the articles prepared from the disclosed herein PET analogs and other polyester-based.

These functional groups provide ways of modifying lignin. One of the most efficient methods of modifying lignin is graft copolymerization. Graft copolymerization can provide controlled lignin-based polymers. A graft copolymer generally consists of a backbone polymer as the main chain and one or more branch polymers connected to the backbone via covalent bonds. There are two primary grafting methods for lignin: graft-from and graft-onto. The "graft-from" method is directed to forming polymers by attaching grafted polymers at a specific active site located on the backbone polymer. In this method, lignin generally acts as a backbone polymer, and the grafted polymer grows at the beginning of lignin by various polymerization methods, including atom transfer radical polymerization, reversible addition-fragmentation chain-transfer polymerization, ring-opening polymerization, and free radical polymerization. In the "graft-onto" method, a separately synthesized polymer is covalently linked with lignin. The "graft-onto" method requires an efficient covalent bond formation between the lignin backbone and the graft polymer's end groups. The disclosed herein methods of making biodegradable polymers can be defined as "graft-onto" methods. It is understood that an abundant amount of aliphatic and phenolic hydroxy groups in lignin offer the possibility for further modification of chemical structure using esterification.

Lignin exhibits attractive thermal behavior. Because of the intra- and inter-molecular hydrogen bonds of lignin, it also can exhibit a thermoplastic behavior. However, the lignin's poor flow properties often hinder its thermoplastic properties. To improve its thermoplastic properties, lignin needs to be copolymerized with other monomers or polymers. In certain aspects, lignin can also act as a thermoset material to form a crosslinked structure at high temperatures.

Lignin is produced in 50 billion tons per year worldwide as an unwanted by-product of the pulp and paper industry. Aside from its abundance and economic advantage, lignin is favorable for its various attractive properties, such as biodegradability, antioxidant activity, high carbon content, high thermal stability, and stiffness. On the other hand, it generally has poor solubility in organic solvents due to the unique blends of functional groups combined with a network structure. The disclosed herein methods offer new alternatives to utilizing lignin to cost-efficiently produce biodegradable polymers while adhering to "cradle-to-cradle" principles.

It is understood that the present disclosure is not limited to any specific types of lignin. In certain aspects, the lignin used in the current disclosure can be obtained from natural lignin products or synthetic model lignin compounds. In still further aspects, lignin used in the current disclosure can be obtained from natural lignin products. It is understood that the natural lignin product can comprise softwood lignin, hardwood lignin, or a combination thereof. In certain aspects and without limitations, the natural lignin product can be obtained from agricultural residues (including corn stover and sugarcane bagasse), (2) dedicated energy crops, (3) wood residues (including sawmill and paper mill discards), and (4) municipal waste, and their constituent parts. In still further aspects, the natural lignin product can be obtained from the paper industry. In certain aspects, lignin used herein can comprise Kraft lignin and lignosulfonate.

Also disclosed herein are the methods comprising: a) providing a functionalized lignin segment comprising carboxylic functional groups; b) providing a vegetable-oil based segment; and c) forming a biodegradable polyester polymer by forming ester linkages between the functionalized lignin segment and the vegetable-oil based segment.

Figure 12:
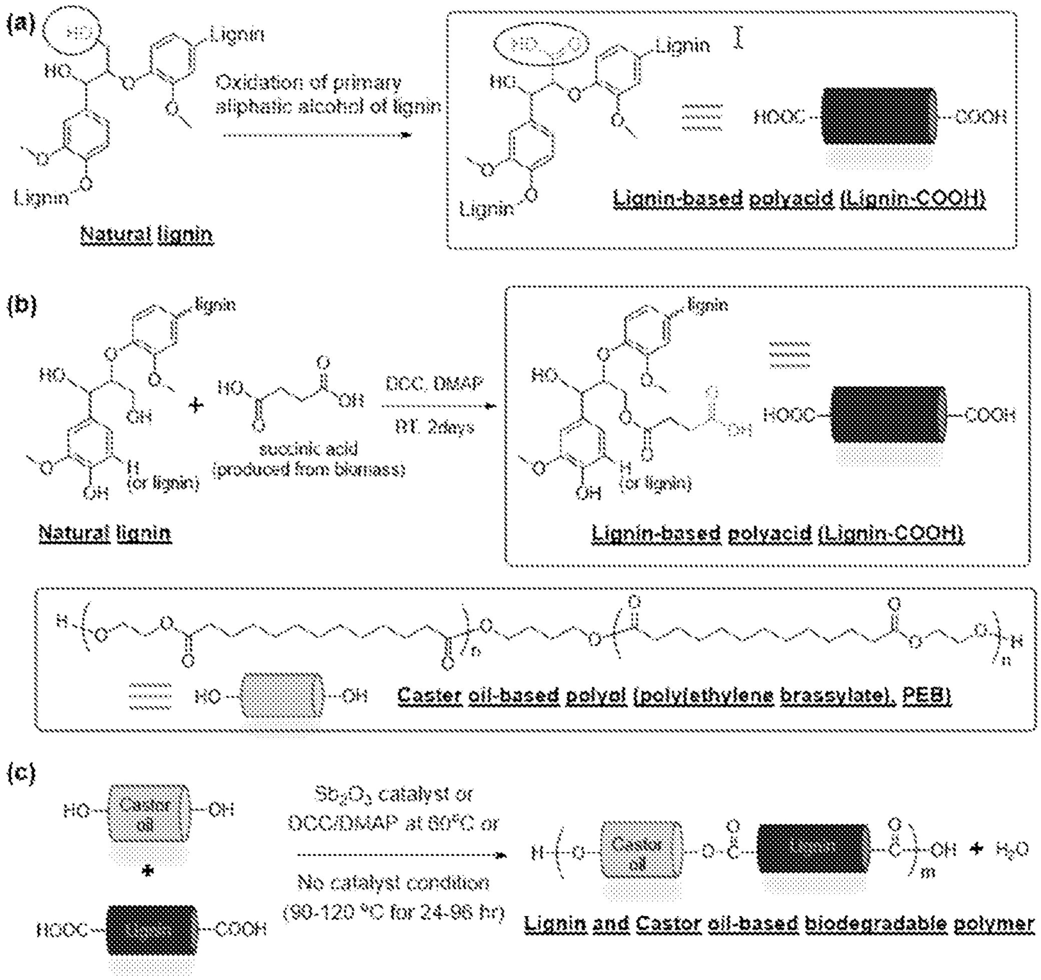
FIG. 12 shows (a) Lignin modification via chemoselective oxidation of alcohols, (b) Lignin modification via esterification with succinic acid. The succinic acid is derived from biomass. (c) Polymerization of lignin-based precursor and castor oil-based poly(ethylene brassylate).

In such aspects, the functionalized lignin segment comprising carboxylic functional groups can be formed by a method comprising a) providing a lignin having a plurality of hydroxyl groups and then b) selectively oxidizing at least one primary aliphatic hydroxyl group to form at least one carboxylic functional group. It is understood that any method known to selectively oxidize the primary aliphatic hydroxyl group in any compound can be utilized. In some aspects, such selective oxidation can be performed without the presence of a catalyst. While in other aspects, such selective oxidation can be performed in the presence of a catalyst. Any known in the art catalysts can be utilized. In some aspects, the catalyst can comprise CuCl. In yet other aspects, the catalyst can comprise 2,2,6,6,-tetramethylpiperidine-N-oxyl (TEMPO). In still further exemplary and unlimiting aspects, the selective oxidation can be catalyzed by potassium permanganate, ruthenium tetroxide, or pyridinium dichromate. Also, methods involving Jones oxidation or Heyns oxidation can be utilized. An exemplary schematic of such selective functionalization is shown in FIG. 12(*a*).

In still further aspects, the functionalized lignin comprising carboxylic functional groups is formed by a method comprising: a) providing a lignin having a plurality of hydroxyl groups; and then b) non-selectively oxidizing at least one phenol group and/or primary aliphatic hydroxyl group and/or secondary aliphatic hydroxyl group to form at least one carboxylic functional group. It is understood that in such aspects, the mixture of various functionalized lignins can be obtained. It is further understood that any oxidation methods that are not directed to selectively oxidize the primary aliphatic alcohols can be utilized. For example, a strong base, such as NaOH, can be used to non-selectively oxidize various hydroxyl groups.

Also disclosed are methods where the functionalized lignin segment comprising carboxylic functional groups can be formed by a method comprising: a) providing a lignin having a plurality of hydroxyl groups; and then b) reacting the lignin with a dicarboxylic acid, a derivative of a dicarboxylic acid, or a combination thereof.

Again, and as disclosed above, such functionalization can be specifically targeted to the specific hydroxylic groups present on the lignin monomer.

For example, the disclosed methods can comprise functionalization of lignin terminal hydroxyl groups to form a functionalized lignin segment comprising terminal carboxylic functional groups. In such aspects, the exemplary terminal hydroxylic groups can be phenolic groups. In further aspects, such functionalizing can comprise reacting the terminal hydroxyl groups of lignin monomer with a carboxylic acid. In certain aspects, the carboxylic acid can comprise a monocarboxylic acid or a dicarboxylic acid. In still further aspects, functionalizing can comprise reacting the terminal hydroxyl groups of lignin monomer with a dicarboxylic acid, a derivative of a dicarboxylic acid, or a combination thereof. It is understood that in such exemplary and unlimiting aspects when a combination of the dicarboxylic acid and the derivative of the dicarboxylic acids is used, the actual derivative of the dicarboxylic acid can comprise a derivative of any known in the art dicarboxylic acid and does not have to be the derivative of the same dicarboxylic acid that can be present in the mixture in a pure form.

In yet other aspects, the dicarboxylic acid, a derivative of the dicarboxylic acid, or a combination thereof, can react with the primary aliphatic alcohol (for example, alkyl alcohol) on the lignin monomer or the phenol, or with a combination thereof. It is understood, and as discussed below, the exact positioning of the resulting carboxylic group functionality can affect the overall biodegradability of the formed polymer. FIG. 12(*b*) shows the reaction with alkyl alcohol to attach a residue of succinic acid.

In such exemplary aspects, the functionalized lignin can have any number of carboxylic acids attached to the main polymer chain. In yet other aspects, the number of carboxylic acids attached to the main polymer chain can be precisely controlled.

In some aspects, the number of carboxylic acids obtained by the functionalization methods disclosed herein can be two or more per each lignin monomer unit. While in still further aspects, the number of carboxylic acids attached to each lignin monomeric unit is precisely two.

It is understood that in some aspects, the methods disclosed herein can also comprise reacting the lignin with an effective amount of monocarboxylic acid prior to the step of reacting the lignin with the dicarboxylic acid, a derivative of a dicarboxylic acid, or a combination thereof. Without wishing to be bound by any theory, it is assumed that in this step, the monocarboxylic acid can react with one or more of the plurality of hydroxyl groups, thereby defining a number of the carboxylic groups present in the functionalized lignin segment comprising carboxylic functional groups. In other words, the number of carboxylic groups present on each monomeric lignin unit can be controlled by exemplary reaction with the effective amount of the monocarboxylic acid to bond undesired hydroxylic groups prior to the reaction with the dicarboxylic acid to form carboxylic group functionalization of lignin. It is understood that the effective amount of the monocarboxylic acid can be determined based on the specific number of hydroxylic groups to be hindered from the reaction with the dicarboxylic acid.

In yet further aspects, the carboxylic acid used to functionalize lignin is a dicarboxylic acid. In still further aspects, the carboxylic acid can comprise oxalic acid, malonic acid, succinic acid, glutaric acid, adipic acid, sebacic acid, pimelic acid, suberic acid, azelaic acid, or any combination thereof. In yet further aspects, the dicarboxylic acid comprises succinic acid, sebacic acid, or a combination thereof. In yet further aspects and as disclosed herein, the dicarboxylic acid derivative can be derivative of any disclosed above acids.

In yet further exemplary and unlimiting aspects, the monocarboxylic acids can comprise any known in the art acids. For example, and without limitation, such acids can comprise acetic acid, formic acid, propionic acid, benzoic acid, sorbic acid, and the like. In still further aspects, the monocarboxylic acid used herein is acetic acid.

In certain aspects, the functionalization can comprise reacting the lignin having hydroxyl groups (whether they are terminal or not) with any known derivative of the carboxylic acid. In certain aspects, the derivative can comprise an anhydride of any carboxylic acid mentioned above. It is understood that the carboxylic acid or its derivative used to functionalize lignin in the current disclosure can also be obtained from a renewable resource. In some exemplary aspects, for example, succinic anhydride can be obtained from the organic biomass.

Figure 2A:
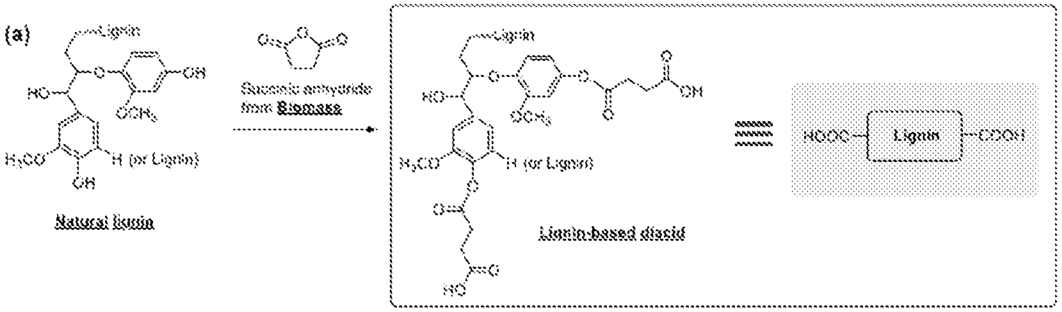

In still further aspects, the scheme of functionalization is shown in FIG. 2A. It can be seen that in these exemplary and unlimiting aspects, during the functionalization step, the hydroxyl groups present on aromatic rings of lignin can react with the exemplary carboxylic acid to form a functionalized lignin segment having two terminal carboxylic functional groups attached to the aromatic ring. In still further aspects, the formed functionalized lignin segment comprises two terminal carboxylic functional groups attached to the aromatic ring. It is understood that in certain aspects, a number of carboxylic acids can be finely tuned to be two for each lignin molecule. In such aspects, the resulting polymer is a linear polymer having desired thermoplastic properties. Without wishing to be bound by any theory, it is hypothesized that in this specific aspect, the strong mechanical and thermoplastic properties in the functionalized lignin can be due to pi-pi stacking of aryl groups. In such aspects, during further esterification of the functionalized lignin, the bonding is done through aryl ester linkages. As discussed in detail below, the ester linkages' precise position can affect the biodegradability of the formed polymer. In such exemplary aspects, the biodegradation of the polymers formed through aryl ester linkages is assumed to take a longer time than the biodegradation of the polymer formed through alkyl ester linkages.

Figure 2B:
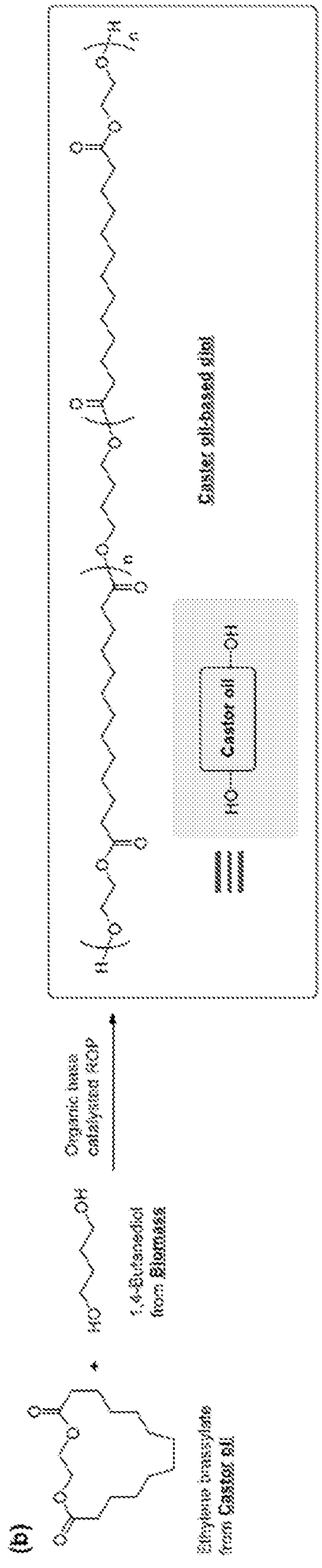
Figure 2C:
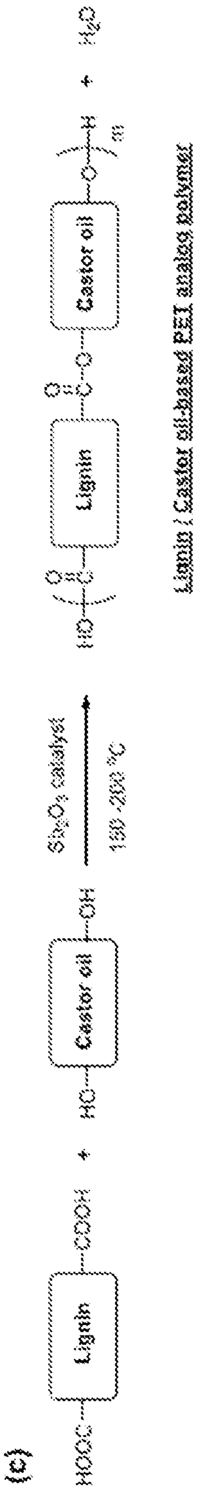

It is noted that in some exemplary aspects, an unwanted esterification reaction between hydroxyl groups and carboxylic acid within lignin can occur. It is understood that such undesired intermolecular esterification can affect the yield of the esterification reaction between carboxylic acid on lignin and hydroxyl groups on the vegetable oil-based segment, as shown in FIG. 2C. Without wishing to be bound by any theory, however, it is assumed that modification of lignin with succinic anhydride, for example, can result in highly selective reactions between the introduced carboxylic acid and hydroxyl groups on a vegetable oil-based segment, and not intramolecular reactions within lignin.

Again, without wishing to be bound by any theory, it is hypothesized that this selectivity is due to the presence of the protruded carboxylic acid (as a result of succinic anhydride modification, FIG. 1*a*) that show a much higher reactivity toward hydroxyl groups on the vegetable oil-based segments than the hydroxyl groups on lignin. The protruded carboxylic acid groups can be sterically more accessible because they are projected outside the lignin molecule.

However, to avoid the unwanted esterification of the lignin hydroxyl group, in some exemplary aspects, the hydroxyl groups on lignin can be eliminated by acetylation. As disclosed above, the monocarboxylic acids can be used to eliminate undesired esterification within the lignin segment. In certain exemplary and unlimiting aspects, the monocarboxylic acid can be used to react with remaining after functionalization with carboxylic groups and/or hydroxylic groups.

In yet other exemplary aspects, longer chain carboxylic acids, for example, and without limitation, such as adipic acid, can also be used to functionalize lignin without using additional monocarboxylic groups. It is further understood that adipic acid, a biomass-based chemical with four carbons between the ester and carboxyl acid, can be an attractive alternative to succinic acid or its anhydride.

In still further aspects, the step of functionalization of lignin with the carboxylic acid can be performed in the presence of a catalyst. In certain aspects, the catalyst can comprise one or more of N, N'-Dicyclohexylcarbodiimide (DCC) or 4-Dimethylaminopyridine (DMAP).

In still further aspects, the step of functionalization can be performed at a temperature from about 15° C. to about 150° C., including exemplary values of about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 100° C., about 110° C., about 120° C., about 130° C., and about 140° C. In yet other aspects, the step of functionalization can be performed at room temperature or any other temperature that provides for a desirable functionalization.

In still further aspects, the step of functionalization as described herein can be performed for a time period of about 1 hour to about 72 hours, including exemplary values of about 2 hours, about 5 hours, about 10 hours, about 15 hours, about 20 hours, about 25 hours, about 30 hours, about 35 hours, about 40 hours, about 45 hours, about 50 hours, about 55 hours, about 60 hours, about 65 hours, and about 70 hours. In still further aspects, the step of functionalization can be performed in any time period having any value between any two foregoing values.

In still further aspects, the step of functionalization as described herein can be performed in the presence of a solvent. In certain aspects, the solvent can comprise dimethylformamide (DMF).

In still further aspects, the functionalized lignin segment can be separated from the rest of the reaction segments and purified by any methods known in the art. In still further aspects, the functionalized lignin segment can have any desired molecular weight. In yet other aspects, the disclosed functionalized lignin segment has a yield from greater than 0 to about 100%. In still further aspects, the yield of functionalization is from about 80% to 100%, including exemplary values of about 85%, about 90%, about 92%, about 95%, about 97%, about 99%, about 99.5%, and about 99.9%.

Figure 3A:
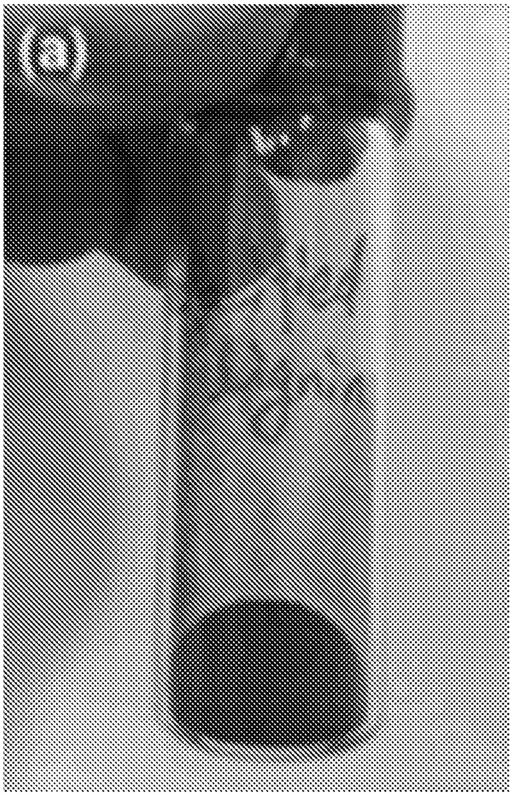

The photograph of the modified lignin after the step of functionalization is shown in FIG. 3A. It is understood that the specific structure of the functionalized lignin segment can be confirmed by a proton nuclear magnetic resonance spectroscopy ($^1$H NMR) and Fourier-transform infrared spectroscopy (FT-IR). In some further exemplary aspects, the number of carboxylic acids on each lignin molecule can be analyzed by $^1$H NMR with an internal standard and gel permeation chromatography (GPC). Some exemplary characterization techniques are shown and further discussed in the Exemplary Section of this disclosure.

In still further aspects, the functionalized lignin segment can comprise a carboxylic acid functionalized lignin monomer, a carboxylic acid functionalized lignin polymer, or a combination thereof.

In yet other aspects, the method disclosed herein further comprises a step of reacting a vegetable-oil segment to form a second precursor. This second precursor can be used to form the disclosed biodegradable polyester polymer.

In some aspects, the vegetable-oil based segment can comprise any vegetable oil having a plurality of alcohol groups. In certain aspects, the vegetable oil can comprise castor oil, soybean oil, olive oil, almond oil, peanut oil, hazelnut oil, walnut oil, angelica root oil, peppermint oil, various essential oils, and the like. It is understood that this list of vegetable oils is only exemplary and non-limiting. In certain aspects, the vegetable-oil can be chosen from vegetable oils that are not commonly used for human or animal consumption. In such aspects, the disclosed process does not compete for food chain sources.

In some aspects, the vegetable-oil based segment can comprise castor oil. While in other aspects, the vegetable-oil segment can comprise a lactone derived from any of the disclosed above vegetable oils. While in still further aspects, the lactone used herein can be derived from the castor oil.

In some aspects, the methods disclosed herein can comprise reacting the vegetable-oil based lactone to form a dialcohol-containing segment.

In aspects where the dialcohol containing segment is present, the step of reacting comprises i) an organic base-catalyzed ring-opening polymerization (ROP) reaction of the vegetable-oil based lactone to form an opened ring lactone derivative; and ii) reacting the opened ring lactone derivative with a dialcohol initiator to form the dialcohol-containing segment.

While in other aspects, the method does not require the presence of the dialcohol segment. In such aspects, the method also comprises an organic base-catalyzed ring-opening polymerization (ROP) of a vegetable-oil based lactone to form an opened ring linear lactone derivative.

Figure 3B:
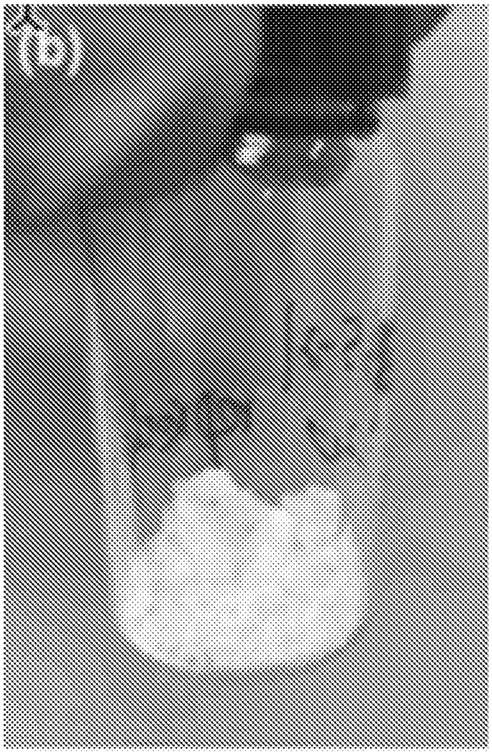

In certain aspects, the vegetable-oil based lactone can comprise an ethylene brassylate (17-membered ring lactone). In certain aspects, the vegetable-oil based lactone is the ethylene brassylate (17-membered ring lactone). The reactive scheme of forming the dialcohol-containing segment from an exemplary lactone is shown in FIG. 2B, with a photograph of the produced poly(ethylene brassylate) shown in FIG. 3B.

In still further aspects, if the dialcohol segment is needed, the dialcohol initiator can form the dialcohol containing segment. In such aspects, any dialcohol known in the art can be utilized. In certain aspects, the dialcohol initiator can also be derived from the biomass. In still further aspects, the dialcohol initiator can be derived from the lignocellulosic sugars. In still further aspects, the dialcohol initiator comprises 1,4-butanediol.

While in other aspects, where there is no requirement for the dialcohol segment, a vegetable-oil based segment can be formed by a direct ROP reaction of ethylene brassylate, for example. In such exemplary aspects, an exemplary polyethylene brassylate (PEB) can be formed.

In some aspects, the ring-opening polymerization (ROP) reaction of the vegetable-oil based lactone can occur in the presence of a catalyst. In certain aspects, the ROP comprises a catalyst. In yet other aspects, the catalyst can comprise any known in the art catalysts. For example, and without limitation, the catalyst can comprise dodecylbenzenesulfonic acid, diphenyl phosphate, p-toluensulfonic acid, 1,5,7-triazabicyclo[4.4.0]dec-5ne (TBD), 1,2,3-tricyclohexylguanidine, 1,2,3-triisopropylguanidine, or any combination thereof. In still further aspects, the catalyst can be present in any amount.

In yet other aspects, the ROP reaction can occur in the presence of an initiator. While in other aspects, the ROP reaction can also occur in the presence of a catalytic accelerator.

In some aspects and as disclosed herein, the catalyst and the initiator can be the same or different. For example, in the aspects where the dialcohol segment is formed, the dialcohol can be an initiator, and TBD can be a catalyst. While in other aspects, for example, when the polyethylene brassylate is formed, the TBD can behave both as an initiator and a catalyst. An exemplary reaction to form PEB is shown in Scheme 2 (Exemplary Section).

In still further aspects, the vegetable-oil based lactone and the dialcohol initiator can be present in any ration to provide a desirable product.

In still further aspects, any of the disclosed herein, ROP reactions can be performed at a temperature range from about 10° C. to about 180° C., including exemplary values of about 20° C., about 30° C., about 40° C., about 50° C., about 60° C., about 70° C., about 80° C., about 90° C., about 100° C., about 110° C., about 120° C., about 130° C., about 140° C., about 150° C., about 160° C., and about 170° C. In yet further aspects, a time period needed to complete the disclosed herein ROP reactions is from about 5 sec to 5 hours, including exemplary values of about 10 sec, about 30 sec, about 1 min, about 10 min, about 30 min, about 1 hour, about 2 hours, about 3 hours, and about 4 hours. In still other aspects, the time period needed to complete the disclosed herein ROP reactions can be any time needed to provide a desirable amount of the product.

In still further aspects, the step of reacting can be performed in the presence of a solvent. Any known in the art solvents can be used, for example, organic solvents, inorganic solvents, ionic liquids, and the like.

In still further aspects, the formed dialcohol-containing segment can be separated from the rest reaction segments and purified by any methods known in the art. In still further aspects, the formed dialcohol-containing segment can have any desired molecular weight. In yet other aspects, the disclosed dialcohol-containing segment has a yield from greater than 0 to about 100%. In yet further aspects, the disclosed dialcohol-containing segment can comprise a dialcohol-containing monomer, a dialcohol-containing polymer, or a combination thereof.

In still further aspects, when the vegetable-oil based segment is derived from polyethylene brassylate (PEB), the PEB can be formed from any ratio of the TBD and ethylene brassylate (EB) (TBD:EB ratio). For example, and without limitations, the ratio can be 1:1 to 1:100, including exemplary values of about 1:2, 1:5, 1:10, 1:15, 1:20, 1:25, 1:30, 1:35, 1:40, 1:45, 1:50, 1:55, 1:60, 1:65, 1:70, 1:75, 1:80, 1:85, 1:90, and about 1:95.

In still further aspects, the PEB can also be formed in the presence of a catalytic accelerator. In such aspects, the catalytic accelerator can comprise any known in the art Lewis acids. For example, and without limitations, $MgX_2$ Lewis acids can be utilized. In such exemplary aspects, X can be chosen from Cl, Br, F, or I. It is understood that any other known in the art Lewis acids can also be used. It is further understood that such catalytic accelerators can also increase the molecular weight of the PEB.

Depending on the ratio between TBD and EB, various PEB having various molecular weights can be formed. For example, the molecular weight of the formed PEB can range from about 1,000 Da to about 50,000 Da, including exemplary values of about 5,000 Da, about 10,000 Da, about 15,000 Da, about 20,000 Da, about 25,000 Da, about 30,000 Da, about 35,000 Da, about 40,000 Da, and about 45,000 Da. The formed PBE can also have a varying polydispersity index (PDI). For example, and without limitation, the PDI can vary from about 1.5 to about 2.3, including exemplary values of about 1.6, about 1.7, about 1.8, about 2.0, about 2.1, about 2.2.

In some aspects, the disclosed method comprises a step of polymerizing the functionalized lignin segment comprising terminal carboxylic functional groups with the formed dialcohol-containing segment to form a biodegradable polyester polymer, wherein the formed biodegradable polyester polymer comprises a lignin-containing segment linked to a vegetable-oil based segment through ester linkages. FIG. 2C shows an exemplary schematic of the condensation polymerization reaction of the functionalized lignin segment and the dialcohol-containing segment. It can be seen that this polymerization reaction results in the ester linkages between the functionalized lignin segment and the dialcohol containing segment.

Yet, in other aspects, the step of forming the biodegradable polyester polymer comprises a condensation polymerization of the functionalized lignin comprising carboxylic functional groups with the formed vegetable-oil based segment to form the ester linkages between the lignin-containing segment and the vegetable oil-based segment. In still further aspects, wherein the ester linkages comprise an alkyl ester linkage, aryl ester linkage, or a combination thereof. As disclosed in detail above, the ester linkage's precise positioning can determine the degree of biodegradability of the final polymer. For example, when the polymerization is done through a phenolic ester linkage, the degradation rate is expected to be slower than in aspects where the polymerization is done through the alkyl ester linkages.

In still further aspects, the step of polymerizing comprises a polymerization catalyst. It is understood that any known in the PET synthesis polymerization catalysts can be utilized. Even further, it is understood that since the formed biodegradable polyester polymer can behave as a PET analog, the production of such biodegradable polymer can be done at any PET manufacturing facility.

In still further aspects, the polymerization catalyst can comprise $Sb_2O_3$, $Sb_2O_5$, antimony acetate, or any combination thereof. In still further aspects, the polymerization catalyst can be present in any amount efficient to provide for the desired product. It is further understood that any water formed as a polymerization byproduct can be removed by a light degree of vacuum (vacuum-melt method). In certain aspects, the step of polymerization can be accelerated by removing water due to the reaction's shift to the right to produce more polyester (FIG. 2C). In certain aspects, the polymerization step can be performed in the absence of a solvent as a bulk polymerization. In yet other aspects, the polymerization step can be performed in the presence of a solvent. The solvents can be any solvents known in the art.

In still further aspects, the polymerization catalyst comprises a nucleophilic catalyst. While in other aspects, the nucleophilic catalyst comprises 4-dimethylaminopyridine (DMAP). In still further aspects, the methods can further comprise comprising a coupling agent. In such aspects, the coupling agent can be N,N'-dicyclohexylcarbodiimide (DCC). Various schemes of forming the biodegradable polymers are shown in the Experimental Section of this disclosure and FIGS. 2 and 12.

In still further aspects, the segments present in the polymerization step, e.g., the modified lignin-containing segment and the dialcohol-containing segment, or the modified lignin-containing segment and vegetable-oil based segment, such as PEB or castor oil, can be present in any ratio that provides for a polymer exhibiting desirable molecular weight and chemical and physical properties. In such exemplary and unlimiting aspects, a ratio of the functionalized lignin-containing segment and the vegetable-oil based segment is from 1:1 to 1:5 based on a weight percent of the polymer, including exemplary values of about 1:2, 1:3, or 1:4.

In still further aspects, the polymerization reaction forms a biodegradable polyester polymer comprising a lignin-containing segment linked to a vegetable-oil based segment through ester linkages. In some exemplary aspects, the biodegradable polyester polymer has a linear molecular structure. In yet other aspects, the biodegradable polyester polymer has a double networked molecular structure.

In aspects wherein the biodegradable polyester polymer has the double networked molecular structure, the step of polymerizing can comprise an additional step of an interpenetrating polymer network preparation. In such aspects, the interpenetrating polymer network preparation step can comprise dissolving the carboxylic acid functionalized lignin monomer within the dialcohol-containing polymer if present. In further aspects, following the dissolution of the carboxylic acid functionalized lignin monomer, a step of polymerization of this monomer within the dialcohol-containing polymer is performed. In such aspects, the dissolution of the carboxylic acid functionalized lignin monomer is performed at the conditions of conditions effective to provide the desired product.

In yet other aspects, the interpenetrating polymer network preparation step can comprise dissolving the dialcohol-containing monomer within the carboxylic acid functionalized lignin polymer. In further aspects, following the dissolution of the dialcohol-containing monomer, the dialcohol-containing monomer is polymerized within the carboxylic acid functionalized lignin polymer. In such aspects, the dissolution of the dialcohol-containing monomer is performed at any conditions effective to provide the desired product.

In some exemplary and unlimiting aspects, the step of forming the biodegradable polyester polymer can also comprise blending the functionalized lignin comprising carboxylic functional groups and the vegetable-oil based segment at a temperature above the melting point of the functionalized lignin comprising carboxylic functional groups and the vegetable-oil based segment.

In still further aspects, the formed biodegradable polyester polymer can be formed into the desired shape. It can be done by molding, extrusion, or any other known in the art methods. In some aspects, the polymer formed by the methods disclosed herein can be extruded into a fiber. In still further aspects, the extrusion can be done by any known in the art methods. In still further aspects, the extrusion can be done in at least one extruder. In certain aspects, the at least one extruder can comprise an extruder screw and an extruder mixing element. In certain aspects, the extruder screw can comprise a conventional barrier screw configured such that pressure and/or temperature fluctuations are minimized in the fiber extrusion process. In still further aspects, the extruder screw can comprise a barrier flight introduced in a transition section between the feed zone, wherein material to be processed is introduced into the extruder screw, and a metering zone, wherein material to be processed is introduced into filtering means. The barrier flight can define two channels, a melt channel and a solids channel, and have clearance between a tip of the barrier flight and a wall of the barrel containing the screw. This clearance can allow the biodegradable polyester polymer to pass from the solids channel into the melt channel. It is understood that the extrusion is performed at any known in the art conditions where no degradation of the biodegradable polyester polymer can occur.

In still further aspects, a filler can be added to the biodegradable polyester polymer. In certain aspects, the filler can be added before the step of shaping. While in other aspects, it can be don't during the step of shaping. For example, and without limitations, when the fiber is formed, the filer can be added to the polymer prior to the step of extruding. In yet other aspects, the filler can be added during the step of extruding. Similarly, it can be done with molding. In some aspects, the filer is added to the polymer prior to the molding step.

Without wishing to be bound by any theory, in certain aspects, the filler can behave as a reinforcing filler; yet in other aspects, the filler can behave as a nucleating agent. In aspects where the filler is present, it can further assist in the crystallization of the biodegradable polyester polymer so that the article can possess strong mechanical properties due to enhanced crystallinity. In still further aspects, the filler can comprise any fillers known in the art. In certain aspects, the filler can comprise magnesium oxide, calcium carbonate, flyash, residual by recycled calcium carbonate (e.g., reclaimed calcium carbonate), aluminum trihydrate, talc, nano-clay, barium sulfate, barite, barite glass fiber, glass powder, glass cullet, metal powder, alumina, hydrated alumina, clay, kaolin clay, magnesium carbonate, calcium sulfate, silica, glass, fumed silica, carbon black, graphite, cement dust, feldspar, nephelinezinc oxide, aluminum silicate, calcium silicate, titanium dioxide, titanates, glass microspheres, chalk, calcium oxide, and any combination thereof. In still further aspects, the filler can be present in an amount from 0 wt % to about 1.5% of the total weight of an article, including exemplary values of about 0.01 wt %, about 0.02 wt % about 0.05 wt %, about 0.07 wt %, about 0.1 wt %, about 0.2 wt %, about 0.5 wt %, about 0.7 wt %, about 1 wt %, and about 1.2 wt %. In still further aspects, the filler can have any desirable size.

In still further aspects, the methods disclosed herein comprise a step of forming an article. It is understood that any articles can be formed from the extruded fiber. In certain aspects and without limitation, the article can comprise packaging, food packaging, disposable cutlery, tableware, film, bags, nets, or any combination thereof.

Biodegradable Polyester Polymer

As summarized above, disclosed herein is a biodegradable polyester polymer comprising: a) a lignin-containing segment; and b) a vegetable-oil based segment, wherein the lignin-containing segment and the vegetable-oil based segment are linked through ester linkages; and wherein the biodegradable polyester polymer has a linear or a double networked molecular structure. In certain aspects, the biodegradable polyester polymer can be a product of two precursors: a modified lignin and a vegetable-oil based polymer.

In certain aspects, the lignin-containing segment present in the disclosed biodegradable polymer comprises a first repeating unit derived from a functionalized lignin monomer comprising carboxylic functional groups. In such aspects, the lignin is first functionalized to form a functionalized lignin. In certain aspects, the modification is performed with a carboxylic acid. In certain aspects, the carboxylic acid can comprise a monocarboxylic acid or a dicarboxylic acid. In yet further aspects, the carboxylic acid used to functionalize lignin is a dicarboxylic acid, a derivative of the dicarboxylic acid, or a combination thereof. In still further aspects, any of the disclosed above carboxylic acids and methods can be used to modify and functionalize lignin.

In still further aspects, the disclosed biodegradable polyester polymer comprises first repeating units derived from the functionalized lignin monomer comprising two or more carboxylic functional groups.

In still further aspects, the vegetable-oil based segment can comprise a second repeating unit derived from a lactone. It is understood that the vegetable-oil based segment can be derived, without any limitation, from any vegetable oil disclosed above. In still further aspects, the lactone present in the vegetable oil can be any lactone described herein. Yet, in further aspects, the lactone can comprise ethylene brassylate monomer. Still, in further aspects, the vegetable-oil based segment can comprise a residue of polyethylene brassylate.

In still further aspects, the ester linkages in the polymer can comprise an alkyl ester linkage, an aryl ester linkage, or a combination thereof. It is understood the specific type of ester linkage can affect the biodegradability of the formed polymer. For example, in aspects where the ester linkage is the alkyl ester linkage, the biodegradable polyester polymer exhibits a first biodegradability. While in other aspects, the ester linkage is a combination of the aryl ester linkage and the alkyl ester linkage, and the biodegradable polyester polymer exhibits a second biodegradability. Yet, in still further aspects, the first biodegradability is higher than the second biodegradability. In other words, without wishing to be bound by any theory, it is expected that the polymers having alkyl ester linkage will degrade faster than those having aryl ester linkages.

In still further aspects, the biodegradable polyester polymer, as described herein, can behave as a PET analog.

It is understood that the disclosed biodegradable polyester polymer can be used to prepare various articles. In order to achieve desirable properties, in some exemplary aspects, the disclosed biodegradable polyester polymer can further comprise a filler. In aspects where the filler is present in the biodegradable polyester polymer, the filler can comprise talc, magnesium oxide, clay, or a combination thereof.

In still further aspects, the biodegradable polyester polymer can exhibit a glass transition temperature ($T_g$) from about −30° C. to about 75° C., including exemplary and non-limiting values of about −25° C., about −20° C., about −15° C., about −10° C., about −5° C., about 0° C., about 5° C., about 10° C., about 15° C., about 20° C., about 25° C., about 30° C., about 35° C., about 40° C., about 45° C., about 50° C., about 55° C., about 60° C., about 65° C., and about 70° C. In still further exemplary aspects, the glass transition temperature can include values of about −15° C., about −14° C., about −13° C., about −12° C., about −11° C., about −10°

C., about −9° C., about −8° C., about −7° C., about −6° C., about −5° C., about −4° C., about −3° C., about −2° C., about −1° C., or about 0° C.

In still further exemplary aspects, the glass transition temperature can include values of about 50° C., about 51° C., about 52° C., about 53° C., about 54° C. about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., or about 70° C. It is understood that the biodegradable polyester polymer can have a glass transition temperature having any value between any two foregoing values.

In still further aspects, the biodegradable polyester polymer can exhibit a melting point ($T_m$) from about 70° C. to about 280° C., including exemplary values of about 75° C., about 80° C., about 85° C., about 90° C., about 95° C., about 100° C., about 110° C., about 120° C., about 130° C., about 140° C., about 150° C., about 160° C., about 170° C., about 180° C., about 190° C., about 200° C., about 210° C., about 220° C., about 230° C., about 240° C., about 250° C., about 260° C., and about 270° C.

In still further aspects, the melting point ($T_m$) can include values of about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C.

In still further aspects, the melting point ($T_m$) can include values of about 170° C., about 171° C., about 172° C., about 173° C., about 174° C., about 175° C., about 176° C., about 177° C., about 178° C., about 179° C., about 180° C., about 181° C., about 182° C., about 183° C., about 184° C., about 185° C., about 186° C., about 187° C., about 188° C., about 189° C., about 190° C., about 191° C., about 192° C., about 193° C., about 194° C., about 195° C., about 196° C., about 197° C., about 198° C., or about 200° C. In still further aspects, the melting point ($T_m$) can include values of about 200° C., about 205° C., about 210° C., about 215° C., about 220° C., about 225° C., about 230° C., about 235° C., about 240° C., about 245° C., about 250° C., about 255° C., about 260° C., about 265° C., about 270° C., about 275° C., or about 280° C. It is further understood that the biodegradable polyester polymer can have a melting point temperature having any value between any two foregoing values.

In still further aspects, the polymer disclosed herein can exhibit a crystallinity temperature ($T_c$) from about 40° C. to about 70° C., including exemplary values of about 45° C., about 50° C., about 55° C., about 60° C., and about 65° C.

In still further unlimiting aspects, the polymer exhibits $T_g$ of about 65° C. and $T_m$ of about 78° C. In still further aspects, the polymer can exhibit a crystallinity temperature ($T_c$) of about 55° C.

In still further aspects, the biodegradable polyester polymer can exhibit a glass transition temperature ($T_g$) from about −10° C. to about 75° C. and exhibit a melting point ($T_m$) from about 70° C. to about 280° C. In still further aspects, the polymer exhibits $T_g$ of about −10° C. and $T_m$ of about 177° C. In still further aspects, the polymer exhibits $T_g$ of about 67° C. and $T_m$ of about 265° C.

In still further aspects, the disclosed biodegradable polyester polymer can be designed to mimic the physical and mechanical properties of the PET polymer. In still further aspects, the disclosed biodegradable polyester polymer can be designed to mimic the physical and mechanical properties of the polyethylene (PP) polymer. While in still further aspects, the disclosed herein biodegradable polymers can be designed to mimic any other polymers depending o the desired application.

In still further aspects, the biodegradable polyester polymer disclosed herein comprises the lignin-containing segment and the vegetable-oil based segment present in any desirable ratio.

In still further aspects, the mechanical properties of the biodegradable polyester polymer can be evaluated using a tensile tester, for example.

In still further aspects, the biodegradable polyester polymer can exhibit Young's modulus from about 0.1 to about 3.0 GPa as measured according to ASTM E111, including exemplary values of about 0.2 GPa, about 0.3 GPa, about 0.4 GPa, about 0.5 GPa, about 0.6 GPa, about 0.7 GPa, about 0.8 GPa, about 0.9 GPa, about 1.0 GPa, about 1.1 GPa, about 1.1 GPa, about 1.2 GPa, about 1.3 GPa, about 1.4 GPa, about 1.5 GPa, about 1.6 GPa, about 1.7 GPa, about 1.8 GPa, about 1.9 GPa, about 2.0 GP, about 2.1 GPa, about 2.2 GPa, about 2.2 GPa, about 2.3 GPa, about 2.4 GPa, about 2.5 GPa, about 2.6 GPa, about 2.7 GPa, about 2.8 GPa and about 2.9 GPa. In yet further aspects, the biodegradable polyester polymer exhibits Young's modulus from about 0.1 to about 0.5 GPa as measured according to ASTM E111.

In still further aspects, the biodegradable polyester polymer can exhibit a maximum tensile strength of about 0.5 to about 60 MPa as measured according to ASTM D638, including exemplary values of about 1 MPa, about 2 MPa, about 3 MPa, about 4 MPa, about 5 MPa, about 6 MPa, about 7 MPa, about 8 MPa, about 9 MPa, about 10 MPa, about 15 MPa, about 20 MPa, about 25 MPa, about 30 MPa, about 35 MPa, about 40 MPa, about 45 MPa, about 50 MPa, and about 55 MPa. In still further aspects, the biodegradable polyester polymer exhibits a maximum tensile strength of about 0.5 to about 10 MPa as measured according to ASTM D638.

In still further aspects, the biodegradable polyester polymer can exhibit an elongation from about 80% to about 150% as measured according to ASTM D638, including exemplary values of about 90%, about 95%, about 100%, about 105%, about 110%, about 115%, about 120%, about 125%, about 130%, about 135%, about 140%, and about 145%.

In still further aspects, the thermal property characterizations of the biodegradable polyester polymer can be further evaluated by differential scanning calorimetry and thermogravimetric analysis.

In still further aspects, the biodegradable polyester polymer can be extruded by the methods disclosed above to form a fiber. It is understood that the fibers extruded from the biodegradable polyester polymer can exhibit the same chemical, mechanical, and thermal properties as the composition itself.

In other aspects, the disclosed biodegradable polyester polymer can degrade after 12 months to within about 14 months when exposed to one or more of salt-water, UV irradiation, hydraulic forces, a mechanical loading, a temperature change, or microorganisms. In still further aspects, the disclosed biodegradable polyester polymer does not degrade for at least 12 months when exposed to one or more of salt-water, UV irradiation, hydraulic forces, a mechanical loading, a temperature change, or microorganisms.

Also disclosed herein are various articles that can be prepared from the disclosed biodegradable polyester polymers. In certain aspects, the articles prepared from the disclosed biodegradable polyester polymer can comprise packaging, food packaging, disposable cutlery, tableware, film, bags, nets, or any combination thereof.

In yet other aspects, the formed net can be used for various applications. For example, and without limitations, the net comprising disclosed compositions can be used to support seafood production.

The shellfish aquaculture industry is one of the most important industries in the world. Only in Florida it has grown dramatically in the past 20 years and shows promise to continue expansion into the future. Hard clams, *Mercenaria mercenaria*, are produced in upland hatcheries, reared to 5-6 mm shell length (SL) in flow-through nursery systems, and then stocked as juveniles into polyester mesh (3-4 mm openings) bags at a rate of 10-20,000 clams per bag (625-1,250/ft$^2$). Juvenile clams are field-nursed in coastal waters to 12-15 mm SL. During this juvenile phase, cover nets are often laid on top of rows of clam bags and anchored to the bottom to provide a barrier between the clams and native predators, primarily Black Drum, *Pogonias cromis*, cownose ray, *Rhinoptera bonasus*, and various crab species. Without the cover net in place, predation can cause significant losses to the crops. Juvenile clams are graded following 3-6 months, depending on season planted, and then restocked into clam bags of a similar size but with larger mesh openings (9-10 mm) at a rate of 1,000-1,200 clams per bag (62-75/ft$^2$) for final grow out to market size, which takes about 12-15 months to reach 25 mm shell width (SW). While most farmers use plastic cover net during the field nursery phase, several types of predator protection methods are used during the grow out phase. This includes the use of galvanized wire (chicken wire), which oxidizes over the course of the grow out period; synthetic coatings, which stiffen the polyester mesh material of the bag; plastic net, the same used for the nursery phase; or a combination of these methods. The method utilized depends on farm location, predator prevalence, and grower preference. Without wishing to be bound by any theory, it is understood that cover netting is critical to prevent predation during the nursery phase when the small clams are vulnerable to predation and when juvenile clams are replanted into the grow-out-size bags.

Commercial fishery and aquaculture industries have received considerable criticism for the loss or abandonment of gear made with synthetic materials. The clam cover net is one of the most abundant and problematic aquaculture debris. Articles, such as the clam cover nets, produced from the disclosed biodegradable polyester polymer, can address these issues and provide an alternative environmentally and economically sustainable solution. Additional articles, such as biodegradable nets material for reef and shoreline restoration, can also be formed.

EXAMPLES

The following examples are put forth so as to provide those of ordinary skill in the art with a complete disclosure and description of how the compounds, compositions, articles, devices and/or methods claimed herein are made and evaluated and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Prophetic Example 1

Figure 4:
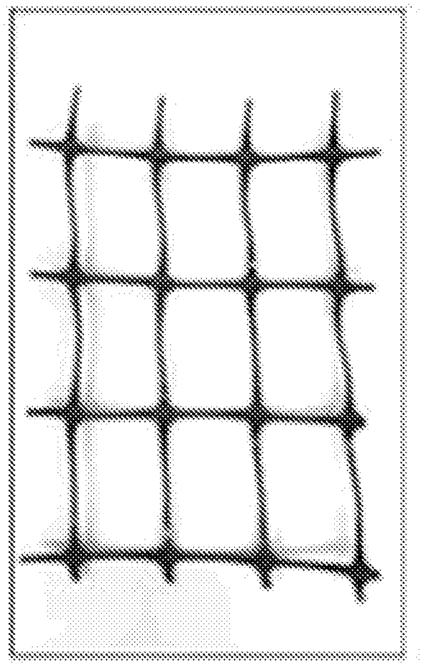
FIG. 4 depicts an exemplary photograph of a polypropylene clam net; the thickness of the net is 2 mm, and the size of each square hole is 1.5×2.5 cm.

The mechanical and thermal properties of the fibers extruded from the disclosed biodegradable polyester polymer will be tested to understand the effect of high-pressure extrusion on final fiber properties. The produced fibers extruded from the disclosed biodegradable polyester polymer can be used to make a clam net by partially melting each fiber cross point. Specifically, the produced fibers can be laid to make square shaped holes, then high heating (near Tm of the new material) can be applied to melt the fiber cross points to form a net. An exemplary photograph of a control polypropylene clam net is displayed in FIG. 4. The dimension and size of the biodegradable net will mimic the conventional polypropylene clam net utilized throughout the industry. The thickness of the current polypropylene clam net is 2 mm, and the size of each square hole is 1.5×2.5 cm.

Prophetic Example 2

Since a clam cover net's primary function is to prevent clams from being consumed by the predatory fish, crab, and ray species, the clam net prepared from the disclosed biodegradable polyester polymer needs to be tested for claim survival and growth. To measure the performance of each treatment, the following data can be collected each time a replicate clam bag is sampled: total or whole weight (g), shell length (SL) (mm), shell width (SW) (mm), and survival (%). Once the experiment is completed, data can be collected on any remaining clam cover netting to assess the state of degradation and tensile strength of the materials following one year of in-water use. In these prophetic examples, it is expected that a significant difference in clam survival can be observed between control (no net) and net treatments, with no significant difference between traditional polypropylene net and biodegradable net treatments in terms of clam survival and growth. Field trials are expected to demonstrate that the disclosed material can perform similaror better than the conventional, plastic clam net in terms of predator protection and remain intact for the duration of the growth-out period. It is also expected that this material can degrade in the coastal environment within 12-14 months.

Prophetic Example 3

The precise timing of the developed polymer's degradation is critical to estimating the functional performance life span and replacement period of the aged net. Generally, polymer degradation occurs by temperature, ultraviolet (UV) irradiation, hydrolysis (covalent bond cleavage), and biological factors (enzymes and microorganism-driven degradation). These degradation mechanisms trigger irreversible changes to polymer materials, such as cracking and subsequent failure. The disclosed biodegradable polyester polymer is expected to be exposed to UV irradiation in seawater, hydraulic forces of wave and tidal action, and a certain degree of mechanical loading due to anchor forces. Prior to the large-scale field experiments, the polymer degradation can be simulated in the laboratory to provide additional insight and allow for further chemical refinement.

The accelerated degradation test can occur in a commercial photoreactor (Luzchem LZC-4X), producing appropriate UV range wavelengths. Within the photoreactor, the prepared polymer sample will be held in 24 ppt salinity artificial seawater with constant stirring (mimicking hydraulic forces) at 15° C. and 30° C. The mechanical loading can be applied by either actual weight or custom designed spring device to apply a designated load to the polymer sample. The seawater can also include typical types of marine microorganisms to study the biological degradation of the disclosed biodegradable polyester polymer. During the test period, the changes of mechanical properties (characterization instrument: tensile tester), molecular weight (characterization instrument: GPC), actual weight (characterization instrument: balance), and color (characterization instrument: CCD camera) will be monitored over time. Presumably, the longest testing time will be 1,000 hours due to the technical maximum lifetime of the UV bulb in the photoreactor.

The accelerated testing period can be converted to an actual time period by two methods. The first and simple method uses average daylight hours (8 hours) to calculate actual days in a marine environment. Thus, 1,000 hours in the lab can be 125 days in an actual marine environment. The second-time conversion method is the calculation of the acceleration factor by comparison of the non-accelerated condition (control) test. In other words, the same polymer sample can be tested without an influencing variable (i.e., without photoreactor). The degree of molecular weight change (or other mechanical property changes) can be compared to determine how fast degradation can occur. In some exemplary aspects, it is assumed that if the non-accelerated condition shows a 5% reduction of molecular weight as the accelerated condition shows a 25% reduction, then the accelerated condition provides five times faster degradation (acceleration factor: 5) than the control.

Prophetic Example 4

A field experiment will be conducted to examine the performance of the biodegradable net in real-world conditions at two different lease sites around Cedar Key. The primary experimental site will be UF/IFAS's 8-acre management agreement, which has been utilized for clam aquaculture studies for more than a decade. The research site is located in the highly productive Dog Island AUZ on the southeast side of Cedar Key (lease location: 29.14434 N Lat, 83.00606 W Long). An additional experimental site will be located at a Clamtastic Seafood Inc. lease site located on the northwest side of Cedar Key, Gulf Jackson AUZ (lease location: 29.16507 N Lat, 83.07743 W Long).

At each experimental site, a total of three treatments will be examined: clam bags with no cover net (trt A, control), clam bags covered with traditional polypropylene netting (trt B), and clam bags covered with the experimental biodegradable netting (trt C). Soft bottom bags, predominately used by Florida clam growers, will be used for the field experiments (see FIG. 4). Nine replicates will be stocked per treatment per site into 9 mm mesh polyester bags (4 feet by 4 feet in size) at a standard density (1150/bag, or 72/$ft^2$) for clam culture following standard culture protocols used in previous field trials. Twenty-seven culture bags will be utilized per location, or a total of 54, during grow out. Three replicate bags of each treatment will be "belted" together (connected with cable ties) and either left uncovered (trt A) or covered with netting (trts B and C) attached to the bags with cable ties. Thus, there will be three "belts" per treatment. A belt per treatment will be placed in a row (e.g., blocked for statistical purposes), but the belts within each row will be randomly assigned. Grow out bags in the belts will be planted directly on the bottom and secured using PVC pipe. Approximately 69,000 grow out-sized seed (12-15 mm SL) will be purchased from a commercial seed supplier in Cedar Key using project funds. All clams stocked across all bags, treatments, and experimental sites will be from the same cohort and of the same age and relative size.

During grow out, a row of three belts, or nine bags, will be sampled at four-month intervals at each location to measure production characteristics. These replicate bags will not be replanted after sampling as the disturbance of pulling clam bags from the bottom sediments and then replacing them can have a negative effect on production characteristics. The field experiments will be terminated after 12 months, which is the typical time required to reach a marketable size of 50 mm.

Measurements of product characteristics for clams sampled at four and eight months and harvest (12 months) will be completed at the Marine Lab in Cedar Key. Production characteristics to be measured include: total live count for survival, SL, SW, and live (total) weight. Production characteristics data will be analyzed using appropriate statistical tests after testing data for underlying assumptions. If necessary, data transformations for analysis will be performed. Statistical differences will be considered if $P<0.05$. Parametric and non-parametric tests will be utilized according to data and underlying assumptions being met. For example, survival data may be analyzed by a non-parametric chi-square test, whereas growth (weight, length) data may be analyzed by ANOVA (or a repeated measurement ANOVA) followed by a means comparison test. Water quality parameters (temperature, salinity, dissolved oxygen, and turbidity) will be measured continuously (every 30 minutes) at monitoring stations consisting of YSI 6600 sondes located near each test site throughout the experiment's duration.

HOBO™ temperature data loggers will be placed inside replicate grow out bags that will be sampled quarterly and for each site. To gather net degradation and strength characteristics, additional biodegradable net pieces will be submerged off a dock near Dog Island AUZ. Net samples (10 cm×15 cm) will be collected monthly and shipped to Dr. Chung's laboratory to measure the net's mechanical properties (Young's modulus, maximum tensile strength, strain at break, and energy-to-break) using a tensile tester. Net performance and degradation can then be assessed across time and this information will be used to further refine the nets chemical structure in the future.

The disclosed biodegradable polyester polymer is expected to demonstrate multiple advantages compared to conventional material (polypropylene) and other aliphatic polyester competitors (PLA, Polyhydroxybutyrate (PHB)) as shown in Table 1.

TABLE 1

Comparison of previous/existing materials with the proposed lignin-based polymer materials; the depicted features of the proposed material are expected results

| Key Metric | Proposed material | Conventional material (polypropylene) | Other aliphatic polyester (PLA[a], PHB[b]) |
|---|---|---|---|
| [Biodegradable | Yes[c] | No | Yes |
| [Biomass-based | Yes[d] | No | No, food originated |

TABLE 1-continued

Comparison of previous/existing materials with the proposed lignin-based polymer materials; the depicted features of the proposed material are expected results

| Key Metric | Proposed material | Conventional material (polypropylene) | Other aliphatic polyester (PLA[a], PHB[b]) |
|---|---|---|---|
| [Sustainable (renewable) | Yes[e] | No | Yes |
| [Easy processed | Yes[f] | Yes | No |
| [Recyclable | Yes[g] | Yes | Very limited. |
| [Cost | Cheap[h] | Cheap | Expensive |
| [Mechanical properties | Tough, strong[i], and easily tunable | Tough and strong | Brittle and fragile |
| Tailor-made properties | Yes[i] | No | No |
| [Novelty | Yes[j] | No | No |

[a]Biodegradable poly(lacticacid),
[b]Biodegradable poly(hydroxybutyrate).
[c]Degradable in seawater after 1-2 years.
[d]Diol and diacid monomers are no-food value biomass based.
[e]All proposed starting materials are plant-based renewable/sustainable/non-toxic chemicals.
[f]The new material's PET analog thermal property will enable to use of currently existing PET thermal processing.
[g]Thermoplasticity of the new materials will enable the recycling of recovered materials.
[h]Lignin and castor oil based ethylene brassylate are much cheaper than PLA and PHB.
[i]Property of new material is strong and highly tunable by lignin ratio, molecular weight, and nucleating agent/reinforcing filler additives.
[j]The proposed material is a completely new material that possesses numerous superiorities compared to conventional clam net materials and other previous aliphatic polyester materials.

Example 5

All chemicals used in this example were purchased from Sigma-Aldrich Ltd. and TCI America and are used without further purification unless otherwise stated. Lignin was purchased from TCI America (Product number L0045, softwood lignin). All organic solvents were degassed with bubbling dry nitrogen gas in the presence of a molecular sieve.

NMR tests were carried out on a Bruker Advance 600 MHz spectrometer. FT-IR spectra were obtained from a PerkinElmer Spectrum 100 FTIR spectrometer in the mode of attenuated total reflectance (ATR). All spectra were internally referenced to $CDCl_3$ of DMSO-$d_6$. The molecular weight of polymers and polydispersity index values were determined on an Agilent-Wyatt combination gel permeation chromatography (GPC) instrument containing three successive Agilent PLgel Mixed C columns, an Agilent 1260infinity series pump, degasser, and autosampler. The Wyatt detection unit hosts the Optilab TrEX refractive index detector. Thermal properties were investigated by TA Instruments Q600 simultaneous thermal analyzer. Thermogravimetric analysis (TGA) and differential scanning calorimeter (DSC) were simultaneously measured by that SDT instrument. Mechanical properties were measured by a Shimadzu tensile-compression tester (model: EZ-LX) equipped with a force transducer (Interface Ltd. model: SM-200 N-168).

NMR analysis. $^1H$, $^{13}C$, and the standard Bruker implementations of two-dimensional HSQC experiments were used for structural characterization. HSQC cross-peaks were assigned by combining the results and compared with the literature data. A matrix consisting of 26×2048 points was obtained in 16 scans.

GPC analysis. GPC measurements were carried out using tetrahydrofuran as the eluent at a flow rate of 1 mL/min at room temperature. An injection volume of 50 μL and a sample concentration of 10 mg/mL were used. A series of polystyrene narrow standards were used for calibration purposes (the actual series was: $M_n$; 580, 2,930, 10,850, 28,500, 59,500, 148,000, 320,000, 841,700, 2,560,000, and 7,500,000 g/mol).

Thermal properties. The melting points and the glass transition temperature ($T_g$) were analyzed by DSC data, and decomposition temperature was analyzed by TGA data. The following procedures were adopted: cycle 1 heated sample to 600° C. with a heating rate of 10° C./min for modified lignin and PEB; or cycle 1 heated sample to 200° C. with heating rate 10° C./min; cycle 2 cooled down to room temperature; cycle 3 was heated to 200° C. with heating rate 10° C./min and heated to 600° C. with heating rate 20° C./min for others.

Mechanical properties. The samples of polymers were prepared in a silicon mold to give uniformly rectangular shapes. The sample was heated above the melting points on the hotplate and slowly cooled down. A synthesized rectangular shape of the polymer sample was clamped at one end and pulled at a constant rate (1 mm/min) of elongation at the other clamped end. All tests were performed at room temperature. Each measurement was repeated at least four times, yielding average and standard deviation. Young's modulus was determined from the slope at the initial range of the stress-strain plot following Hookean behavior. For ductile polymers, the Hookean behavior occurs before 1% of strain in general. The measured maximum tensile strength was the maximum stress value of the obtained stress-strain plot. Energy-to-break was determined from the area under the stress-strain plot.

Synthesis of Sebacic Acid-Modified Lignin (Functionalized Lignin)

Ten grams of lignin and sebacic acid (28.8 g, 142 mmol) were added into 190 mL of DMF and stirred 15 min to fully dissolve. N,N'-dicyclohexylcarbodiimide (DCC, 15.0 g, 72.7 mmol) was added to the mixture solution. Separately prepared 4-dimethylaminopyridine (DMAP, 2.8 g, 22.9 mmol) in 10 mL of DMF solution was then slowly added to the reaction mixture. The dark brown reaction mixture was stirred at room temperature for 48 h followed by vacuum filtration to remove formed white solids of dicyclohexyl urea (DCU), a by-product of DCC esterification. The dark solution precipitated in 1M aqueous HCl solution. The yielded slurry-like solution was vacuum filtered to collect brown solids and dried in a vacuum overnight. The final product was a brown solid.

An illustrated example of the sebacic modified lignin is demonstrated in Scheme 1:

Scheme 1

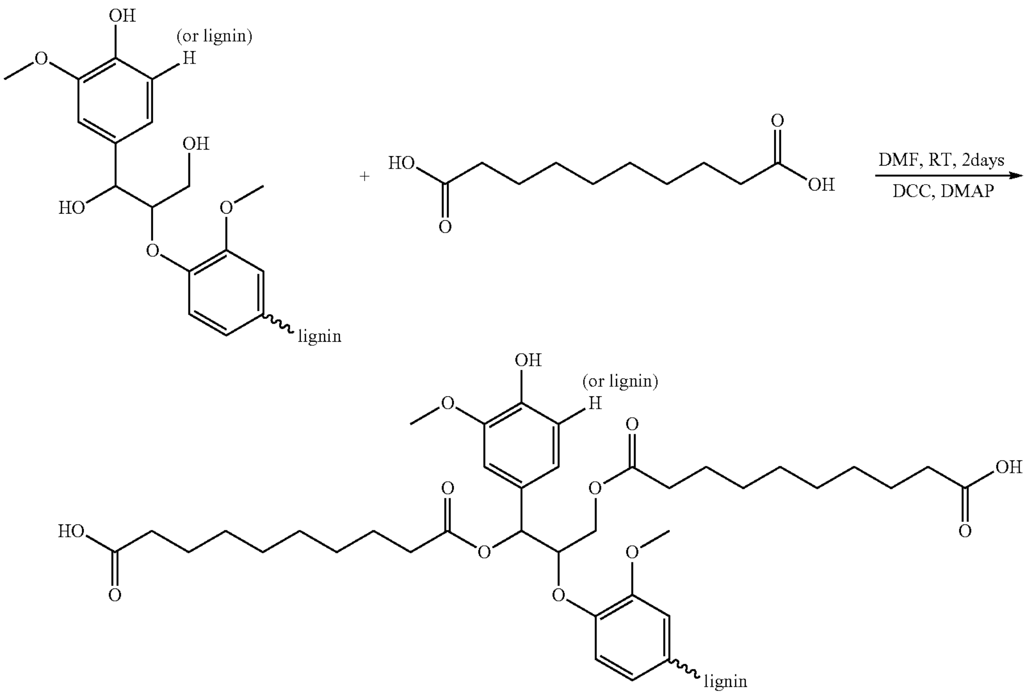

Figure 5:
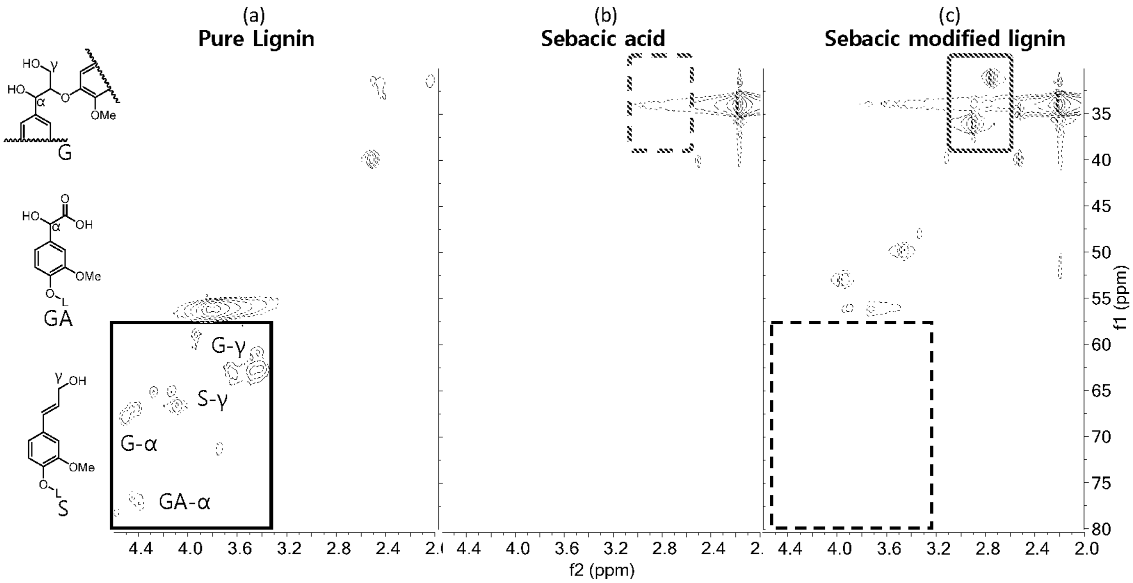
FIG. 5 shows an HSQC 2D-NMR spectrum of (a)—pure lignin, FIG. (b)-sebacic acid, and (c)-sebacic modified lignin.
Figure 6:
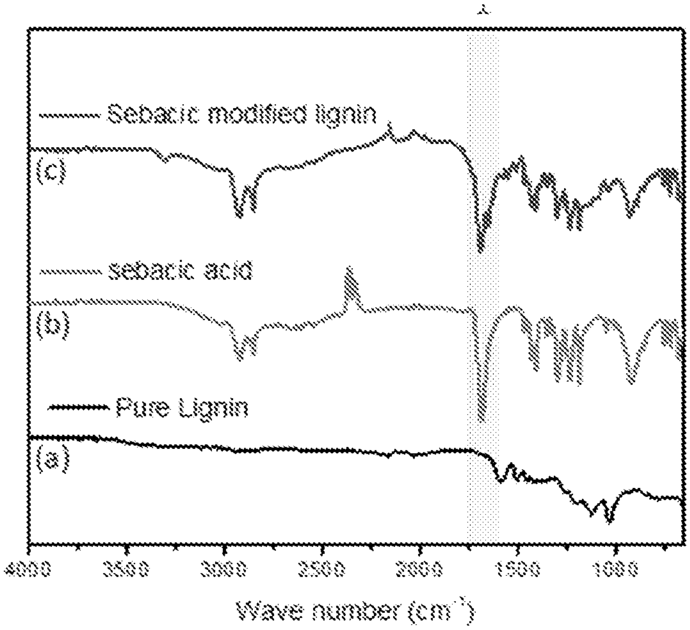
FIG. 6 shows an FT-IR spectrum of (a) pure lignin, (b) sebacic acid, (c) sebacic modified lignin.

HSQC2-D NMR and FT-IR were used to confirm modified lignin. Modified lignin is confirmed by HSQC 2D NMR, as shown in FIG. 5. The three molecules are mainly repeating units in lignin (FIG. 5, left). Before the reaction, peaks of numerous hydroxyl groups in the pure lignin are revealed (FIG. 5(*a*) black square box region, $\delta_H/\delta_C$: 3.3-4.5 ppm/57-80 ppm). After the reaction, all peaks of hydroxyl groups disappeared in the sebacic lignin (FIG. 5(*c*), black square region). Furthermore, a peak of the ester group in the sebacic acid (FIG. 5(*b*), red dot square region,($\delta_H/\delta_C$: 2.5-3.1 ppm/30-40 ppm) was not observed. After the reaction, the peaks of the ester group have appeared in the sebacic lignin (FIG. 5(*c*), red square region). In the FT-IR data, the lack of C═O stretch peak at the 1600-1800 $cm^{-1}$ indicates that there isn't any carbonyl or carboxylic functional group in the pure lignin ((FIG. 6(*a*), black line). The one C═O stretch peak at 1683 $cm^{-1}$ indicates the presence of a carboxylic acid functional group in the sebacic acid (FIG. 6(*b*), red line). After the reaction, the absorption band of the ester group (R—COO—R'), which is the reaction site of lignin and sebacic acid, and carboxylic acid (R—COOH), the other side of the sebacic acid, appear at 1652 $cm^{-1}$ and 1683 $cm^{-1}$ (FIG. 6(*c*), blue line). According to these data, it was confirmed that sebacic functionalized lignin was synthesized by esterification.

Synthesis of poly(ethylene brassylate) (PEB)

In a typical homopolymerization, 30 mL of ethylene brassylate (115.6 mmol) was dissolved in 12 mL of DMF and degassed for 15 min. The TBD (268 mg, 1.93 mmol), as an initiator and catalyst, was added to the reaction mixture. The solution was stirred at 80° C. overnight. The product solution was diluted with 12 mL of chloroform and precipitated with cold diethyl ether. The formed solids were filtered and dried under the vacuum at room temperature. The obtained product was a white solid.

An illustrated example of the polyethylene brassylate is demonstrated in Scheme 2:

Scheme 2

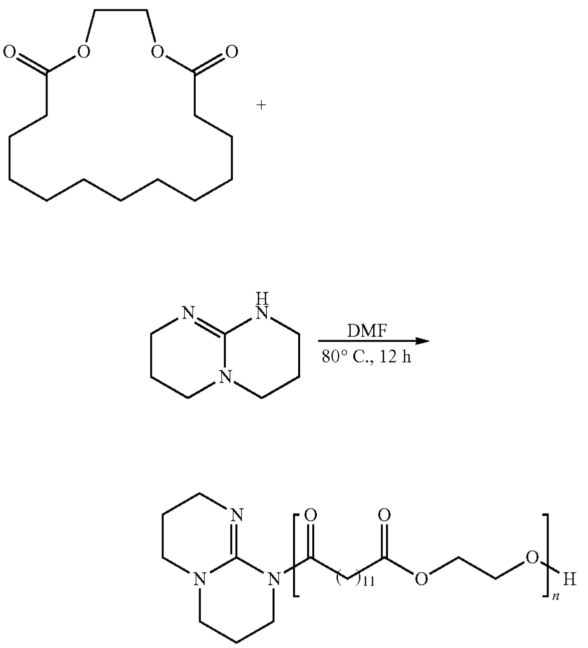

Figure 7:
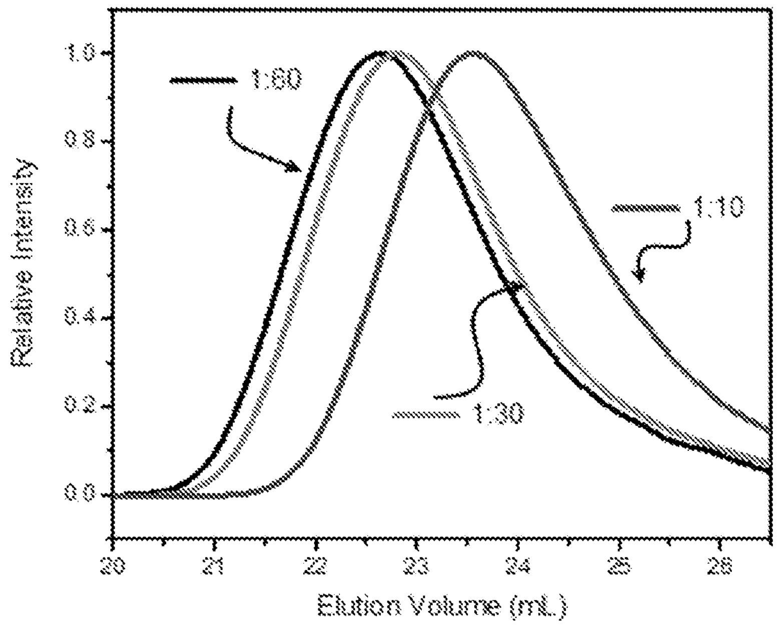
FIG. 7 shows GPC traces of PEB. The ratio of TBD with EB was 1:60 (black line), 1:30 (red line), and 1:10 (blue line).

$^1H$ NMR and GPC were used to confirm PEB presence. FIG. 7 depicts GPC traces of several PEB, which have different molecular weights. The ratio, as shown, is TBD to ethylene brassylate (TBD:ethylene brassylate). The conversion, molecular weights, and polydispersity index (PDI) are presented in Table 2. Conversion of monomer was measured by disappearance of the α-methylene of ethylene brassylate (4.29 ppm) and appearance of the α-methylene of polyethylene brassylate) (4.24 ppm). High conversion of the polymerization was observed for all samples (>90%). The molecular weight of the polymers was determined by two methods: $^1$H NMR and GPC-MALS. The number-average molecular weight ($M_n$) of PEB(1:60) was 17.09 kDa, and its polydispersity index (PDI) value was 1.82 (FIG. 7, black line). The $M_n$ of PEB(1:30) was 11.98 kDa, and its PDI value was 2.06 (FIG. 7, red line). The $M_n$ of PEB(1:10) was 5.94 kDa, and its PDI value was 2.03 (FIG. 7, blue line). During the polymerization, the viscosity of the reaction solution was increased. Due to this reason, the PDI value presented almost 2.0. Using these GPC traces, it was confirmed that several PEB having different molecular weights were successfully synthesized by having a different ratio of TBD and monomer. In this specific example, a PEB formed from the ratio of TBD to ethylene brassylate of 1:60 was used to synthesize lignin-graft-PEB.

TABLE 2

PEB characteristics from different ratios of TBD to EB

| [TBD]/[EB] | Conversion[a] (%) | $M_n$, theor[b] (kDa) | $M_{n,\ GPC}$[c] (kDa) | PDI[c] |
|---|---|---|---|---|
| 1/10 | 95 | 2.70 | 5.94 | 2.03 |
| 1/30 | 98 | 8.08 | 11.98 | 2.06 |
| 1/60 | 95 | 15.5 | 17.09 | 1.82 |

[a]Conversion of polyethylene brassylate, as determined by $^1$H NMR from the α-methylene of ethylene brassylate and poly(ethylene brassylate) resonances.
[b]Number molecular weight calculated from $([EB]_0/[TBD]_0 \times \text{conversion} \times 270.36) + 138$.
[c]Experimental Mn and PDI determined by GPC in THF.

Synthesis of lignin-graft-poly(ethylene brassylate) (lignin-graft-PEB)

One gram of the functionalized lignin and three grams of PEB were added into 28 mL of DMF and stirred for 10 min at 60° C. to completely dissolve. Separately prepared DCC (115 mg, 1.11 mmol) in 1 mL of DMF solution was added into the reaction solvent. After that, separately prepared 4-dimethylaminopyridine (DMAP, 16 mg, 0.13 mmol) in 1 mL of DMF solution was slowly added to the reaction mixture. The reaction mixture was stirred at 80° C. for 48 h, followed by vacuum filtration. The brown solution was precipitated with cold diethyl ether and vacuum filtered to collect a dark brown solid and dried in a vacuum overnight. The obtained product was a brown solid.

An illustrated example of lignin-graft-PEB is demonstrated in Scheme 3:

Scheme 3

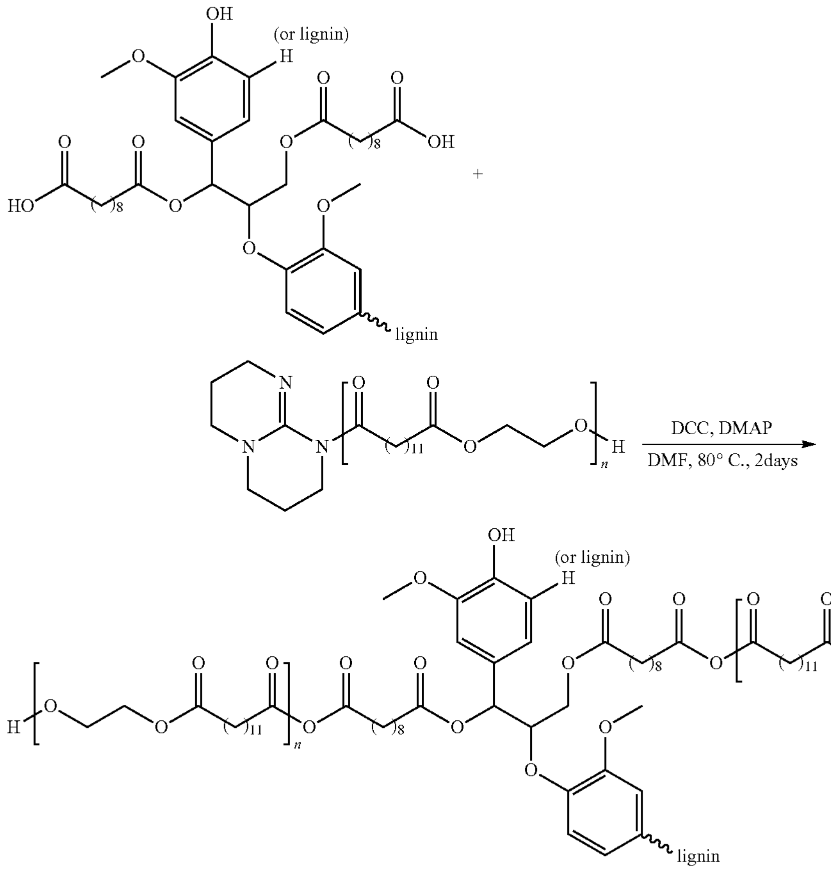

Figure 8:
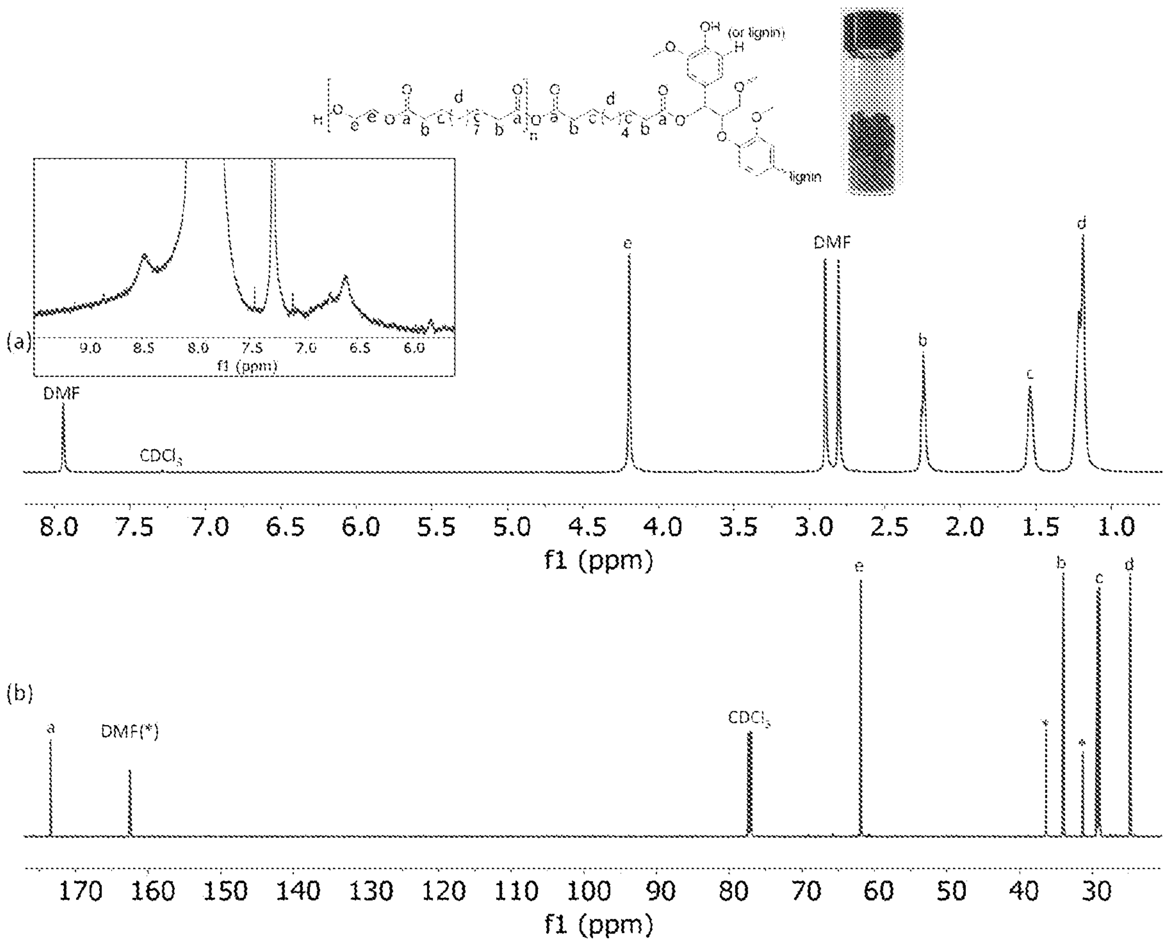
FIG. 8 shows an NMR spectrum of SL-PEB copolymer. (a) 1H NMR, the Inset shows a zoom of the lignin proton region, (b) 13C NMR, the top image shows the color of SL-PEB.
Figure 9:
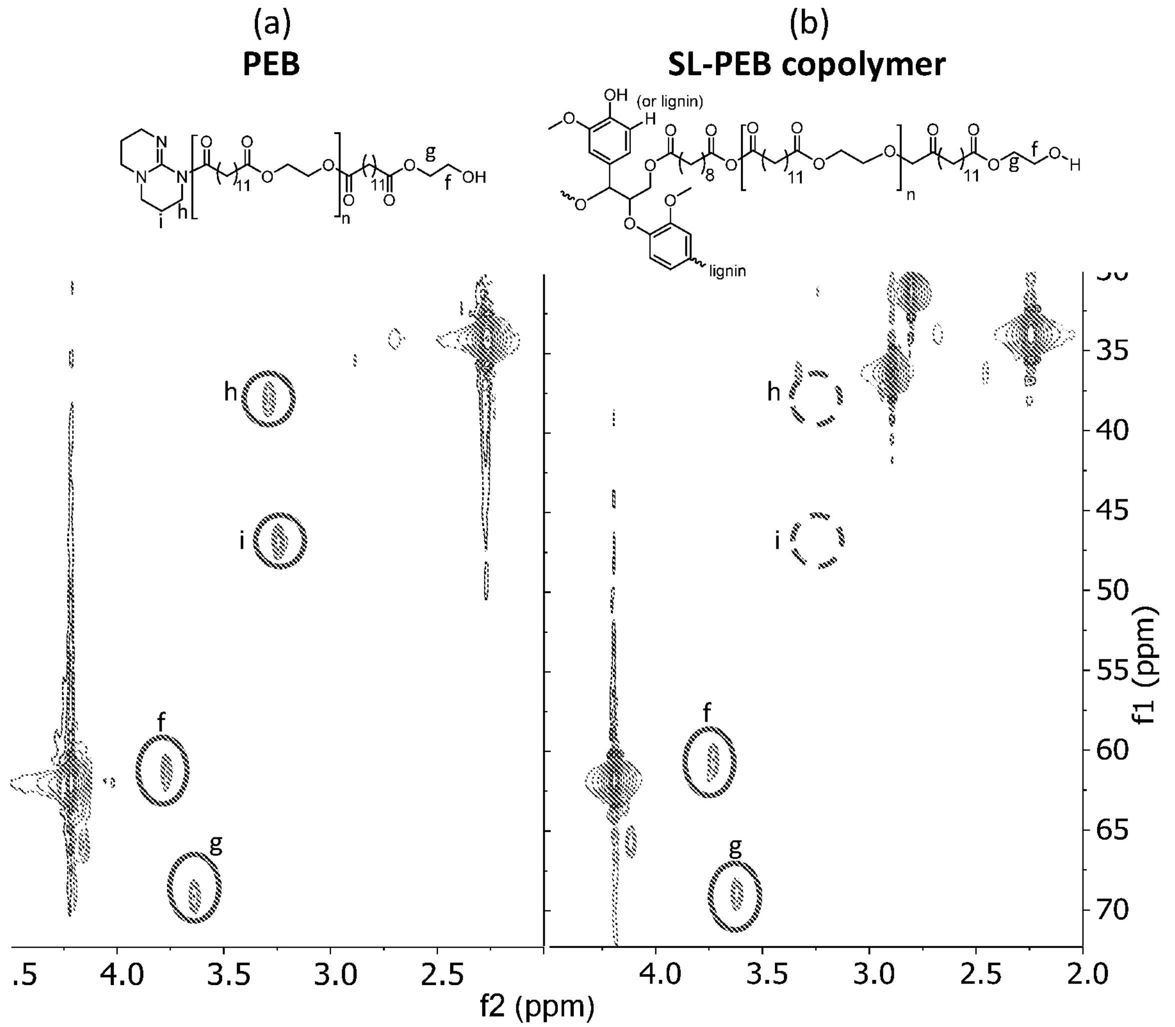
FIG. 9 shows an HSQC-2D NMR spectrum of (a) PEB and (b) SL-PEB.

NMR was used to confirm lignin-graft-PEB, as shown in FIG. 8 and FIG. 9. The NMR solvent was $CDCl_3$, but the solubility of lignin-graft-PEB was poor. Although a few drops of DMF were added to solve the solubility problem, it was too low. FIG. 8(*a*) showed the $^1H$ NMR of SL-PEB. The appearance of protons 'b'(2.24 ppm), 'c'(1.54 ppm), and 'd'(1.19 ppm) confirms the successful introduction of linkage between modified lignin and PEB. The peak of 'e' proton from ether linkage of PEB repeating unit appearances at 4.19 ppm. The peak of protons from lignin appearances at 6.61 (inset image of FIG. 8(*a*)). The $^{13}C$ NMR spectrum (FIG. 8(*b*)) showed the same conclusion that the copolymer was successfully synthesized. The peak of carboxylic carbon 'a' was observed at 173 ppm, and 'b,' 'c,' and 'd' carbons were observed at 34, 29, and 24 ppm. The 'e' carbon from the ether linkage of the PEB part was observed at 61 ppm.

FIG. 9 shows HSQC 2D NMR spectra of PEB and lignin-graft-PEB. The peaks of both terminal groups from PEB are revealed in FIG. 9(*a*). The peaks of the TBD terminal are shown at (3.75, 61.26) and (3.61, 69.13) ($\delta_H$, $\delta_C$), also, the peaks of the alkyl alcohol terminal are shown at (3.22, 46.84) and (3.26, 37.88). After the reaction, the peaks of alkyl alcohol from lignin-graft-PEB are shown at (3.70, 60.78) and (3.59, 69.02), as shown in FIG. 9(*b*). The peaks of the ester group from the modified lignin part ($\delta_H/\delta_C$: 2.5-3.1 ppm/30-40 ppm) are also observed in FIG. 9(*b*). The proton and carbon from ether linkage of PEB part (4.19, 61) and alpha proton and carbon of carbonyl group (2.24, 34) were observed in both FIGS. 9(*a*) and (*b*). Using these spectra, it was confirmed that the reaction occurred at the TBD terminals of PEB.

Blending of Modified Lignin and PEB

One gram of the functionalized lignin and three grams of PEB were added to the 20 mL vial. The mixture was stirred at 80° C., above the melting point of PEB and modified lignin, for 30 min and cooled down to RT. The final product was brown solid.

Thermal Properties of Polymers

Figure 10:
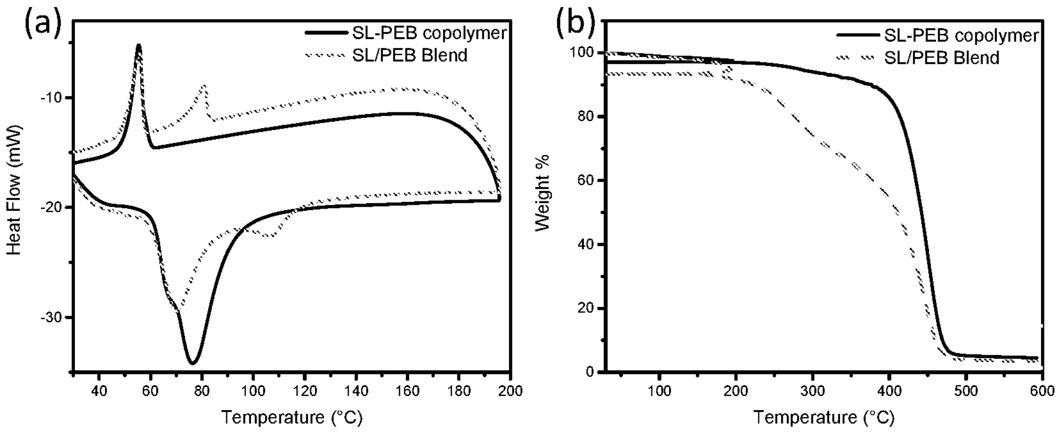
FIG. 10 shows (a) DSC curve of SL-PEB copolymer (black solid) and SL/PEB blend (red dash), (b) TGA trace of SL-PEB copolymer (black solid) and SL/PEB blend (red dash).

DSC curves of polymers are shown FIG. 10(*a*). As shown in the DSC trace (FIG. 10(*a*), black line), the lignin-graft-PEB is a semi-crystalline polyester with a glass transition temperature ($T_g$) of 65° C., melting temperature ($T_m$) of 78° C., and crystallinity temperature ($T_c$) of 55° C. Thermal property of blended polymer was also tested to investigate the effect of chemical linkage between modified lignin and PEB. $T_g$ of the blend was not observed, and two $T_m$ were observed at 71° C. and 107° C., as shown in FIG. 10(*a*), red dash line. During the cooling cycle, $T_c$ at 56° C. and 81° C. was observed. The trace of blended polymers indicates each polymer's separated chemical properties because there was no linkage between SL and PEB. PEB is a semi-crystalline long-chain polyester with a $T_m$ of 73° C. The $T_g$ of PEB is −33° C., as shown in the literature. In this example, this value could not be measured due to instrumentation limitations. DSC curve of sebacic functionalized lignin showed a $T_m$ of 123° C. At the same time, the $T_g$ was not determined clearly. Thermal properties are summarized in Table 3.

TABLE 3

Thermal properties of lignin-graft-PEB and modified lignin/PEB blend.

| Samples | $T_g$ (° C.) | $T_m$ (° C.) | $T_c$ (° C.) |
|---|---|---|---|
| lignin-graft-poly(ethylene brassylate) | 65 | 78 | 55 |
| SL/PEB Blend | —[a] | 71 and 107 | 56 and 81 |
| PEB | — | 73 | —[b] |
| modified lignin | — | 123 | — |

[a]not detected,
[b]not measured

The weight loss of polymers is shown in the TGA curve (FIG. 10(*b*)). The weight loss of lignin-graft-PEB started around 240° C., accelerated at 390° C., and reached zero at 480° C. (FIG. 10(*b*), black solid line). The weight loss of blended polymer started around 150° C., accelerated at 230° C. and 380° C., and reached zero at 470° C. (FIG. 10(*b*), red dash line). The weight loss of PEB started around 210° C., accelerated at 390° C., and reached zero at 400° C. The weight loss of sebacic modified lignin started around 150° C. and decomposed steadily to 490° C. Inhere, lignin-graft-PEB showed the most stable thermal property. On the other hand, blended polymer showed a combination trend of PEB and sebacic modified lignin.

Mechanical Properties of Polymers

Figures 11A, 11B, 11C:
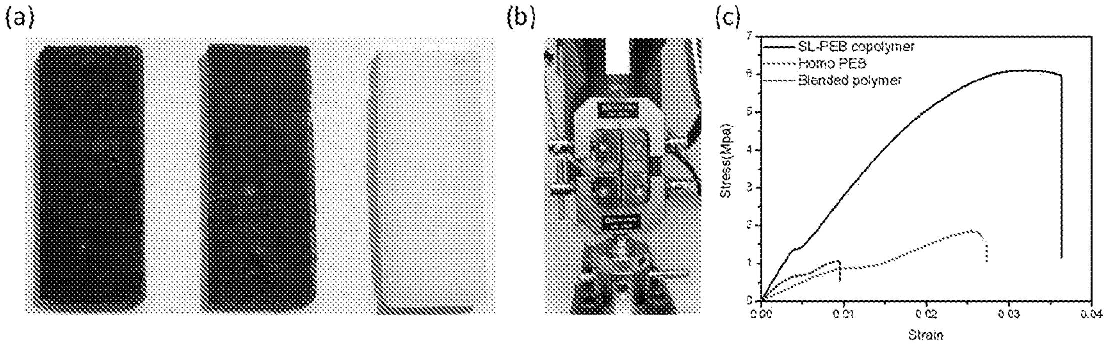
FIG. 11 shows (a) images of lignin-graft-PEB (left), blended polymer (middle), and PEB (right), (b) a sample of lignin-graft-PEB undergoing the tensile test. (c) strain-stress curves of polymers.

The images of tested polymer samples are shown in FIG. 11(*a*). The left sample is lignin-graft-PEB, and the right sample is PEB. The center sample is a modified lignin/PEB blended polymer plate. Due to the solid sample's high brittleness, it was difficult to prepare a plate from the modified lignin. The prepared plates were measured by static tensile tests (FIG. 11(*b*)). Strain-stress curves (S—S curves) of polymers are shown in FIG. 11(*c*).

Lignin-graft-PEB samples demonstrated higher mechanical properties, Young's modulus, strain at break, maximum tensile strength, and energy to break than blended polymer and homePEB (FIG. 11(*c*) and Table 4). The highest Young's modulus of lignin-graft-PEB is 442.9 MPa with a 1:3 wt % ratio. This Young's modulus is much higher than the modulus (165 MPa) of commonly used polyolefin, low-density polyethylene (LDPE). Overall, Young's modulus of lignin-graft-PEB reveals a medium value between two very popular polyolefins, LDPE (Young's module 165 MPa) and low-density polyethylene (HDPE, Young's module 800 MPa) (ref). In addition, the measured tensile strength was 7.34 MPa (FIG. 11(*c*) and Table 4) for the lignin-graft-PEB (1:3 wt % in Table 4). For comparison, frequently used commercial LDPE's maximum tensile strength is 10.3 MPa. Although the newly synthesized lignin-graft-PEB reveals slightly lower maximum tensile strength than LDPE, a small amount of reinforcement additive (1 wt % or less) may enhance the maximum tensile strength significantly. Thus, the new lignin-based polymer, lignin-graft-PEB, can be a promising polymer comparable to commercial polyolefins.

Another significant point of the mechanical property test results is the importance of covalent bonding to link lignin and PEB to achieve high mechanical strength. When the blend sample (lignin+PEB, no covalent linking) is compared to the same lignin-graft-PEB contents (covalent linking), the lignin-graft-PEB demonstrated much higher mechanical properties, Young's modulus, maximum tensile strength, strain at break, and energy to break. Without wishing to be bound by any theory, it was assumed that the reason for the poor mechanical property of a blended polymer is microlevel phase separations. To compare with homoPEB, lignin serves as the hard domain in the newly synthesized lignin-graft-PEB. Thus, the heterogeneously dispersed lignin can make the smallest value of strain at break in the blended. Also, the mechanical properties of PEB showed expected r results as a soft domain in this system, which is the smallest young's modulus and elastic property.

Table 4 demonstrates the effect of molecular weight of PEB and the ratio of PEB and modified lignin on mechanical properties. Three different modified lignin ratios to PEB, 1:1, 1:3, 1:5, were compared to study the effect of the amount of PEB on mechanical properties. The lignin-graft-PEB composed of a 1:1 ratio of modified lignin to PEB (SL-PEB 11) showed an extremely lower Young's modulus and maximum tensile strength compared to other polymers composed of 1:3 ratio (SL-PEB 13) and 1:5 ratio (SL-PEB 15). Without wishing to be bound by any theory, it was hypothesized that these observations are due to a possible presence of numerous small-sized pores that have low modulus and max tensile strength. In the melting step for synthesizing the plate, the 1:1 ratio of copolymer particles turned to soft like rubber, not melting even at high temperature. To evaluate this hypothesis, a plate was prepared by applying pressure without removing voids. Without wishing to be bound by any theory, it was assumed that the presence of the voids would have an obvious impact on mechanical properties. A comparison of SL-PEB 13 and SL-PEB 15 found that higher lignin contents result in remarkable mechanical properties, including Young's modulus and maximum tensile strength. Without wishing to be bound by any theory, it was hypothesized that an increase in mechanical properties accompanying an increase in lignin amount is due to lignin serving as the hard domain of these copolymers.

TABLE 4

Mechanical properties of SL-PEB copolymer, blended polymer, and homo PEB.

| Sample | $M_n$ of PEB | Wt % of SL: PEB | Young's modulus (MPa) | Max. tensile strength (MPa) | Strain at break (l/delta, no unit) | Energy to break (MPa) |
|---|---|---|---|---|---|---|
| SL-PEB | 16.9 kDa | 1:1 | 209.8 (±28.7)[a] | 1.93 (±0.71)[a] | 0.020 (±0.007)[a] | 0.020 (±0.011)[a] |
| | 16.9 kDa | 1:3 | 442.9 (±30.5) | 7.34 (±1.04) | 0.031 (±0.004) | 0.047 (±0.015) |
| | 16.9 kDa | 1:5 | 382.9 (±17.3) | 3.18 (±0.62) | 0.017 (±0.002) | 0.027 (±0.012) |
| | 13.1 kDa | 1:3 | 270.3 (±53.4) | 1.20(±0.69) | 0.025 (±0.015) | 0.016 (±0.014) |
| | 6.5 kDa | 1:3 | 291.1 (±35.0) | 1.54 (±0.49) | 0.012 (±0.003) | 0.012 (±0.006) |
| Blend | 16.9 kDa | 1:3 | 220.7 (±30.8) | 1.06 (±0.36) | 0.013 (±0.003) | 0.009 (±0.003) |
| PEB | 16.9 kDa | 0:1 | 238.4 (±124.6) | 3.65 (±2.52) | 0.026 (±0.004) | 0.018 (±0.004) |

[a]standard deviation is shown in parenthesis

Also, three different molecular weights of PEB, 16.9 kDa, 13.1 kDa, and 6.5 kDa, were compared to evaluate the effect of PEB length on the final polymer's mechanical properties. The lignin-graft-PEB synthesized using PEB having a molecular weight of 16.9 kDa, (SL-PEB-16.9) demonstrated higher modulus and maximum tensile strength when compared to the lignin-graft-PEB synthesized using PEB having a molecular weight of 13.1 kDa, (SL-PEB-13.1) and copolymer with PEB, which molecular weight was 6.5 KDa, (SL-PEB-6.5). This observation suggests that the mechanical properties of these copolymers can be affected by different levels of entanglement due to the length of the polymer chain. The longer chain makes a higher level of entanglement, and therefore, it can show better mechanical properties. Again, without wishing to be bound by any theory, it was assumed that the increased mechanical property of higher molecular weight was due to enhance polymer entanglements. On the other hand, SL-PEB-6.5 demonstrated a larger modulus and maximum tensile strength and a smaller strain at the break due to the relatively low molecular weight. It was further assumed that it might have fewer entanglements between its chains due to the shorter length of polymers, and thus it exhibits more brittle behavior than SL-PEB-13.1.

In summary, the biodegradable polymers disclosed herein can act as alternative materials to non-degradable plastics, which made numerous environmental pollutions, with good thermal stability and enhanced mechanical properties.

Example 6

Chemoselective Lignin Modification and Following PEB Integration to the Modified Lignin.

Without wishing to be bound by any theory, it was proposed to control the polymers' biodegradability by chemoselectivity of the lignin functionalization.

In this example, natural lignin (for example, softwood kraft lignin) is functionalized by converting primary aliphatic (for example, aryl) alcohols to carboxylic acids via oxidation. (FIG. 12*a*).

The direct modification route can reduce at least one reaction step compared to commonly used methods. Therefore, the new lignin functionalization method is more environmentally benign as it would require fewer chemicals and solvents and shorter times. The oxidation can be performed in two ways: 1) chemoselective oxidation of primary alkyl alcohol (FIG. 12*a*, circled alcohol) and 2) non-selective oxidation of alcohols (primary, secondary, and phenolic alcohols) on lignin. These two different oxidation methods can lead to two different lignin-based polymers, for example, lignin polymers having alkyl ester linkages and randomized ester linkages (aryl ester+alkyl ester). Without wishing to be bound by any theory, it is assumed that lignin-based polymers having alkyl ester linkages yield facilitated biodegradation. The comparison of the two degradations is shown in FIG. 13.

It is understood that natural lignin has primary and secondary aliphatic alcohols and phenols. The selective oxidation of the lignin's primary alcohol can be conducted in the presence of a 2,2,6,6-tetramethylpiperidine-N-oxyl (TEMPO) catalyst, for example. The prepared lignin-based precursor (FIG. 12(*a, b*)) is a hard segment of the biodegradable polymer.

Figures 13A, 13B:
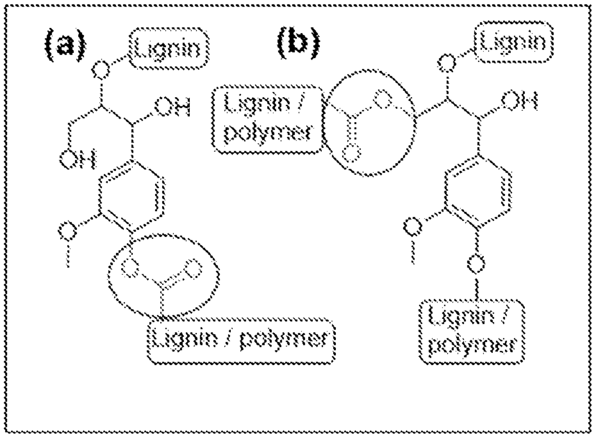
FIG. 13 shows two typical ester linkages in lignin-based polymers: (a) ester from phenol (aryl ester) and (b) alkyl ester.

In this example, two different esters covalently linked lignin to poly(ethylene brassylate) were evaluated (FIG. 13). The first chemical structure (FIG. 13(*a*) contains an aryl ester, the ester group located right next to the aryl group (benzene ring, circled). The second structure in FIG. 13(*b*) depicts an ester group linked to an alkyl group. The alkyl ester (FIG. 13(*b*), circled) can be hydrolyzed (degrade) easier than aryl ester through a nucleophilic attack due to easier steric accessibility and resonance effects of the conjugate structures. Herein, aryl ester linkage containing lignin-based polymers is less active during hydrolysis due to stabilizing the conjugated structure's resonance effect.

In non-chemoselective oxidation of lignin, an aryl ester and alkyl ester mixture can be produced, showing slower degradation than all alkyl ester linkages.

Additionally, the esterification of phenol and alkyl alcohols, such as acid-catalyzed esterification with excess alcohol, can be used to improve chemoselectivity on lignin functionalization.

Example 7

This example shows that the functionalization of lignin can be controlled by a precise number of carboxylic group functionalities introduced on a lignin monomer. Previous lignin modifications yield an uncontrolled number of functionalities (e.g., carboxylic acids) on lignin. Thus, the final polymer, after PEB integration to lignin, commonly yielded highly crosslinked polymers. As one of ordinary skill in the art would readily appreciate, mechanical and thermal properties of the polymers can be affected by the degree of crosslinking present in the polymer. The proposed herein method allows to more precisely control such properties.

The number of carboxylic acids is finely tuned to be two for each lignin molecule, resulting in a linear polymer required to achieve the desired thermoplastic properties. To prepare linear modified lignin (lignin contains two carboxylic acids per lignin molecule), acetic acid and succinic acid can be reacted with lignin. The acetic acid can react with the hydroxyl groups of lignin, thereby blocking hydroxyl groups. Therefore, precise control of the number of carboxylic acids per each lignin molecule can be achieved. The number of carboxylic acid groups can be precisely tuned by changing the ratio between acetic acid and succinic acid.

Example 8

Additional PEB Synthesis Method

In this example, $MgX_2$ Lewis acid can be used as a catalytic accelerator in ring opening polymerization of ethylene brassylate (17-membered ring lactone). The catalytic accelerator, $MgX_2$ Lewis acid, can facilitate the rate-determining ring opening step by enhancing the positive polarization of the carbonyl carbon (attacking site for nucleophiles during ROP) in the reaction mechanism. The regioselectivity (ethylene brassylate has two esters in a ring) of ROP of ethylene brassylate is also under investigation.

Example 9

FIG. 12(*c*) shows condensation polymerization in the presence of a common industrial PET catalyst, $Sb_2O_3$. As water is formed as the polymerization byproduct, it is removed by a small amount of vacuum pressure (vacuum-melt method). The removal of water accelerates the polymerization due to the reaction shift to the right favoring more polyesters (FIG. 12(*c*)). The polymerization is initially tested without a solvent as a bulk polymerization. After establishing the initial working synthetic method, the following parameters were systematically tested: 1) molar ratio of lignin (hard segment)/castor oil (soft segment) precursor and 2) molecular weight (length of the poly(ethylene brassylate)). Other miscellaneous polymerization conditions such as reaction temperature, degree of vacuum, catalyst amount and reaction time can also be carefully controlled and examined.

Example 10

Direct Integration of Lignin and Castor Oil (Vegetable Oil) Without Intermediate Chemical Compounds.

It was found that the cost and environmental impact can be further reduced by using castor oil without any additional purification or modification steps. Carboxylic acids on the modified lignin and hydroxyl groups on castor oil can covalently link, thereby forming biodegradable ester bonds.

The new polymer contents can be sourced from 100% biomass, including polyesters from lignin, castor oil, bio-based lactone, and dynamic bonds. Biodegradable biomasses, lignin and castor oil, can be integrated by biodegradable covalent ester linkages. Therefore, the produced polymer is completely biodegradable. All utilized biomasses are not human food. The highly chemoselective oxidation towards the primary alcohol of lignin and subsequent condensation reaction with castor oil provides the covalently linked polymer architecture. The unmodified natural castor oil (not castor oil-derived product) is directly and covalently integrated into lignin with cheap, safe, simplistic, high yield, and eco-friendly reactions.

Figure 14:
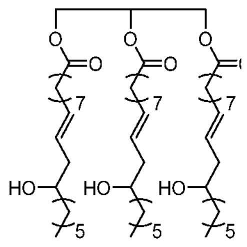
FIG. 14 shows a castor oil chemical structure.

Castor oil, produced from the castor plants, is not be consumed by humans as food and is readily available in large quantities. Worldwide castor seed production in 2013 was 1.44 million tons, and the production is rapidly increasing. Castor oil is a hydroxylated lipid which is a triglyceride of fatty acids (FIG. 14). Approximately 90% of the fatty acid composition of the castor oil is ricinoleic acid, which is a hydroxylated monounsaturated 18 carbon carboxylic acid. Compared to various vegetable oils, castor oil is a very promising raw material for polymer synthesis due to its hydroxyl group.

Castor oil's hydroxyl group can react to carboxylic acids on functionalized lignin (lignin-COOH). The direct polycondensation of lignin and castor oil (not derivative) is a significant advance in the unexplored direct polymer production area from unmodified biomass.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, segments may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

ASPECTS

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

Aspect 1: A biodegradable polyester polymer comprising: a) a lignin-containing segment; and b) a vegetable-oil based segment, wherein the lignin-containing segment and the vegetable-oil based segment are linked through ester linkages; and wherein the biodegradable polyester polymer has a linear or a double networked molecular structure.

Aspect 2: The biodegradable polyester polymer of claim 1, wherein the lignin-containing segment comprises a first repeating unit derived from a functionalized lignin monomer comprising carboxylic functional groups.

Aspect 3: The biodegradable polyester polymer of Aspect 2, wherein the functionalized lignin monomer comprises two or more carboxylic functional groups.

Aspect 4: The biodegradable polyester polymer of any one of Aspects 1-3, wherein the vegetable-oil based segment comprises a second repeating unit derived from a lactone.

Aspect 5: The biodegradable polyester polymer of Aspect 4, wherein the lactone comprises ethylene brassylate monomer.

Aspect 6: The biodegradable polyester polymer of any one of Aspects 1-5, wherein the polymer exhibits a glass transition temperature ($T_g$) from about −10° C. to about 70° C. and a melting point ($T_m$) from about 170° C. to about 280° C.

Aspect 7: The biodegradable polyester polymer of Aspect 6, wherein the polymer exhibits $T_g$ of about −10° C. and $T_m$ of about 177° C.

Aspect 8: The biodegradable polyester polymer of Aspect 7, wherein the polymer exhibits $T_g$ of about 67° C. and $T_m$ of about 265° C.

Aspect 9: The biodegradable polyester polymer of any one of Aspects 1-8, wherein the biodegradable polyester polymer exhibits Young's modulus from about 1.5 to about 3.0 GPa as measured according to ASTM E111.

Aspect 10: The biodegradable polyester polymer of any one of Aspects 1-9, wherein the biodegradable polyester polymer exhibits a maximum tensile strength of about 25 to about 60 MPa as measured according to ASTM D638.

Aspect 11: The biodegradable polyester polymer of any one of Aspects 1-10, wherein the biodegradable polyester polymer exhibits an elongation from about 80% to about 150% as measured according to ASTM D638.

Aspect 12: The biodegradable polyester polymer of any one of Aspects 1-11, wherein the biodegradable polyester polymer degrades after 12 months to within about 14 months when exposed to one or more of salt-water, UV irradiation, hydraulic forces, a mechanical loading, a temperature change, or microorganisms.

Aspect 13: The biodegradable polyester polymer of any one of Aspects 1-11, wherein the biodegradable polyester polymer does not degrade for at least 12 months when exposed to one or more of salt-water, UV irradiation, hydraulic forces, a mechanical loading, a temperature change, or microorganisms.

Aspect 14: The biodegradable polyester polymer of any one of Aspects 1-13, further comprising a filler.

Aspect 15: The biodegradable polymer of Aspect 14, wherein the filler comprises talc, magnesium oxide, clay, or a combination thereof.

Aspect 16: A method comprising: functionalizing a lignin having terminal hydroxyl groups to form a functionalized lignin segment comprising terminal carboxylic functional groups; reacting a vegetable-oil based lactone to form a dialcohol-containing segment; and polymerizing the functionalized lignin segment comprising terminal carboxylic functional groups with the formed dialcohol-containing segment to form a biodegradable polyester polymer, wherein the formed biodegradable polyester polymer comprises a lignin-containing segment linked to a vegetable-oil based segment through ester linkages.

Aspect 17: The method of Aspect 16, wherein the step of functionalizing comprises reacting the lignin having terminal hydroxyl groups with a dicarboxylic acid, a derivative of a dicarboxylic acid, or a combination thereof.

Aspect 18: The method of Aspect 17, wherein the dicarboxylic acid comprises a succinic acid.

Aspect 19: The method of any one of Aspects 16-18, wherein the functionalized lignin segment comprises two carboxylic functional groups.

Aspect 20: The method of any one of Aspects 16-19, wherein the step of reacting comprises: an organic base-catalyzed ring-opening polymerization (ROP) reaction of the vegetable-oil based lactone to form an opened ring lactone derivative; and reacting the opened ring lactone derivative with a dialcohol initiator to form the dialcohol-containing segment.

Aspect 21: The method of Aspect 20, wherein the vegetable-oil based lactone comprises ethylene brassylate.

Aspect 22: The method of Aspect 20 or 21, wherein the dialcohol initiator is derived from a biomass.

Aspect 23: The method of any one of Aspects 20-22, wherein the ROP reaction comprises a catalyst.

Aspect 24: The method of Aspect 23, wherein the catalyst comprises dodecylbenzenesulfonic acid, diphenyl phosphate, p-toluensulfonic acid, 1,5,7-triazabicyclo[4.4.0]dec-5ne (TBD), 1,2,3-tricyclohexylguanidine, 1,2,3-triisopropylguanidine, or any combination thereof.

Aspect 25: The method of any one of Aspects 16-24, wherein the step of polymerizing comprises a condensation polymerization of the functionalized lignin comprising carboxylic functional groups with the formed dialcohol-containing segment to form the ester linkages between the lignin-containing segment and the vegetable oil-based segment.

Aspect 26: The method of any one of Aspects 16-25, wherein the step of polymerizing comprises a polymerization catalyst.

Aspect 27: The method of Aspect 26, wherein the polymerization catalyst comprises $Sb_2O_3$, $Sb_2O_5$, antimony acetate, or any combination thereof.

Aspect 28: The method of any one of Aspects 16-27, wherein the functionalized lignin segment comprises a carboxylic acid functionalized lignin monomer, a carboxylic acid functionalized lignin polymer, or a combination thereof.

Aspect 29: The method of any one of Aspects 16-28, wherein the dialcohol-containing segment comprises a dialcohol-containing monomer, a dialcohol-containing polymer, or a combination thereof.

Aspect 30: The method of any one of Aspects 16-29, wherein the formed biodegradable polyester polymer has a linear or a double networked molecular structure.

Aspect 31: The method of Aspect 30, wherein to form the biodegradable polyester polymer having the double networked molecular structure, the step of polymerizing comprises an interpenetrating polymer network preparation step.

Aspect 32: The method of Aspect 31, wherein the interpenetrating polymer network preparation step comprises dissolving the carboxylic acid functionalized lignin monomer within the dialcohol-containing polymer and then polymerizing the carboxylic acid functionalized lignin monomer within the dialcohol-containing polymer.

Aspect 33: The method of Aspect 31, the interpenetrating polymer network preparation step comprises dissolving the dialcohol-containing monomer within the carboxylic acid functionalized lignin polymer and then polymerizing the dialcohol-containing monomer within the carboxylic acid functionalized lignin polymer.

Aspect 34: The method of any one of Aspects 16-33, wherein the biodegradable polyester polymer exhibits a glass transition temperature ($T_g$) from about −10° C. to about 70° C. and a melting point ($T_m$) from about 170° C. to about 280° C.

Aspect 35: The method of Aspect 34, wherein the biodegradable polyester polymer exhibits $T_g$ of about −10° C. and $T_m$ of about 177° C.

Aspect 36: The method of Aspect 34, wherein the biodegradable polyester polymer exhibits $T_g$ of about 67° C. and $T_m$ of about 265° C.

Aspect 37: The method of any one of Aspects 16-36, wherein the biodegradable polyester polymer exhibits Young's modulus from about 1.5 to about 3.0 GPa as measured according to ASTM E111.

Aspect 38: The method of any one of Aspects 18-37, wherein the biodegradable polyester polymer exhibits a maximum tensile strength of about 25 to about 60 MPa as measured according to ASTM D638.

Aspect 39: The method of any one of Aspects 18-38, wherein the biodegradable polyester polymer exhibits an elongation from about 80% to about 150% as measured according to ASTM D638.

Aspect 40: The method of any one of Aspects 18-39, wherein the biodegradable polymer degrades after 12 months to within about 14 months when exposed to one or more of salt-water, UV irradiation, hydraulic forces, a mechanical loading, a temperature change, or microorganisms.

Aspect 41: The method of any one of Aspects 18-39, wherein the biodegradable polyester polymer does not degrade for at least 12 months when exposed to one or more of salt-water, UV irradiation, hydraulic forces, a mechanical loading, a temperature change, or microorganisms.

Aspect 42: The method of any one of Aspects 18-41, further comprising extruding the biodegradable polyester polymer into a fiber.

Aspect 43: The method of any one of Aspects 18-42, wherein the method further comprises adding a filler to the biodegradable polyester polymer.

Aspect 44: The method of Aspect 43, wherein the filler comprises talc, magnesium oxide, clay, or a combination thereof.

Aspect 45: The method of any one of Aspects 42-44, further comprising forming an article comprising the extruded fiber.

Aspect 46: The method of Aspect 45, wherein the article comprises a net.

Aspect 47: A fiber comprising the biodegradable polyester polymer of any one of Aspects 1-15.

Aspect 48: An article comprising the biodegradable polyester polymer of any one of Aspects 1-15.

Aspect 49: The article of Aspect 48 comprising a net.

Aspect 50: A biodegradable polyester polymer comprising: a) a lignin-containing segment; and b) a vegetable-oil based segment, wherein the lignin-containing segment and the vegetable-oil based segment are linked through ester linkages; and wherein the biodegradable polyester polymer has a linear or a double networked molecular structure.

Aspect 51: The biodegradable polyester polymer of Aspect 50, wherein the lignin-containing segment comprises a first repeating unit derived from a functionalized lignin monomer comprising carboxylic functional groups.

Aspect 52: The biodegradable polyester polymer of Aspect 51, wherein the functionalized lignin monomer comprises two or more carboxylic functional groups.

Aspect 53: The biodegradable polyester polymer of any one of Aspects 51-52, wherein the functionalized lignin monomer comprises a residue of a dicarboxylic acid, a derivative of a dicarboxylic acid, or a combination thereof.

Aspect 54: The biodegradable polyester polymer of Aspect 53, wherein the dicarboxylic acid comprises sebacic acid, succinic acid, or a combination thereof.

Aspect 55: The biodegradable polyester polymer of any one of Aspects 51-54, wherein the functionalized lignin monomer further comprises at least one residue of a monocarboxylic acid.

Aspect 56: The biodegradable polyester polymer of Aspect 55, wherein the monocarboxylic acid comprises acetic acid.

Aspect 57: The biodegradable polyester polymer of any one of Aspect 50-56, wherein the ester linkages comprise an alkyl ester linkage, an aryl ester linkage, or a combination thereof.

Aspect 58: The biodegradable polyester polymer of Aspect 57, wherein the ester linkage is the alkyl ester linkage, and wherein the biodegradable polyester polymer exhibit a first biodegradability.

Aspect 59: The biodegradable polyester polymer of Aspect 57, wherein the ester linkage is a combination of the aryl ester linkage and the alkyl ester linkage, and wherein the biodegradable polyester polymer exhibit a second biodegradability.

Aspect 60: The biodegradable polyester polymer of Aspect 57 or 59, wherein the first biodegradability is higher than the second biodegradability.

Aspect 61: The biodegradable polyester polymer of any one of Aspects 50-61, wherein the vegetable-oil based segment comprises a second repeating unit derived from a polyol.

Aspect 62: The biodegradable polyester polymer of any one of Aspects 50-60 wherein the vegetable-oil based segment comprises a second repeating unit derived from a lactone.

Aspect 63: The biodegradable polyester polymer of Aspect 61, wherein the second repeating unit comprises a linear residue derived from the lactone.

Aspect 64: The biodegradable polyester polymer of Aspect 62 or 63, wherein the lactone comprises ethylene brassylate monomer.

Aspect 65: The biodegradable polyester polymer of Aspect 64, wherein the linear residue comprises repeating units of a polyethylene brassylate residue.

Aspect 66: The biodegradable polyester polymer of Aspect 65, wherein a polyethylene brassylate used to form the p polyethylene brassylate residue has a molecular weight from about 6.0 kDa to about 20 kDa.

Aspect 67: The biodegradable polyester polymer of any one of Aspects 50-66, wherein the vegetable-oil based segment is derived from castor oil.

Aspect 68: The biodegradable polyester polymer of any one of Aspects 50-67, wherein a ratio of the lignin-containing segment and the vegetable-oil based segment is from 1:1 to 1:5 based on a weight percent of the polymer.

Aspect 69: The biodegradable polyester polymer of any one of Aspects 50-68, wherein the polymer exhibits a glass transition temperature ($T_g$) from about −30° C. to about 70° C. and a melting point ($T_m$) from about 70° C. to about 280° C.

Aspect 70: The biodegradable polyester polymer of Aspect 69, wherein the polymer exhibits $T_g$ of about 65° C. and $T_m$ of about 78° C.

Aspect 71: The biodegradable polyester polymer of Aspect 70, wherein the polymer exhibits a crystallinity temperature ($T_c$) of about 55° C.

Aspect 72: The biodegradable polyester polymer of Aspect 71, wherein the polymer exhibits $T_g$ of about −10° C. and $T_m$ of about 177° C.

Aspect 73: The biodegradable polyester polymer of Aspect 69, wherein the polymer exhibits $T_g$ of about 67° C. and $T_m$ of about 265° C.

Aspect 74: The biodegradable polyester polymer of any one of Aspects 50-73, wherein the biodegradable polyester polymer exhibits Young's modulus from about 0.1 to about 3.0 GPa as measured according to ASTM E111.

Aspect 75: The biodegradable polyester polymer of Aspect 74, wherein the biodegradable polyester polymer exhibits Young's modulus from about 0.1 to about 0.5 GPa as measured according to ASTM E111.

Aspect 76: The biodegradable polyester polymer of any one of Aspect 50-75, wherein the biodegradable polyester polymer exhibits a maximum tensile strength of about 0.5 to about 60 MPa as measured according to ASTM D638.

Aspect 77: The biodegradable polyester polymer of Aspect 76, wherein the biodegradable polyester polymer exhibits a maximum tensile strength of about 0.5 to about 10 MPa as measured according to ASTM D638.

Aspect 78: The biodegradable polyester polymer of any one of Aspect 50-77, wherein the biodegradable polyester polymer exhibits an elongation from about 80% to about 150% as measured according to ASTM D638.

Aspect 79: A composition comprising the biodegradable polyester polymer of any one of Aspects 50-78 and a filler.

Aspect 80: The composition of Aspect 79, wherein the filler comprises talc, magnesium oxide, clay, or a combination thereof.

Aspect 81: An article comprising the biodegradable polyester polymer of any one of Aspects 50-78.

Aspect 82: An article comprising the composition of any one of Aspects 79 or 80.

Aspect 83: The article of Aspect 81 or 82, wherein the article comprises packaging, food packaging, disposable cutlery, tableware, film, bags, nets, or any combination thereof.

Aspect 84: A method comprising: a) providing a functionalized lignin segment comprising carboxylic functional groups; b) providing a vegetable-oil based segment; and c) forming a biodegradable polyester polymer by forming ester linkages between the functionalized lignin segment and the vegetable-oil based segment.

Aspect 85: The method of Aspect 85, wherein the functionalized lignin segment comprising carboxylic functional groups is formed by a method comprising: a) providing a lignin having a plurality of hydroxyl groups; and b) selectively oxidizing at least one primary hydroxyl group to form at least one carboxylic functional group.

Aspect 86: The method of Aspect 85, wherein the step of selectively oxidizing is performed in the presence of a catalyst.

Aspect 87: The method of aspect 86, wherein the catalyst comprises 2,2,6,6,-tetramethylpiperidine-N-oxyl (TEMPO).

Aspect 88: The method of Aspect 84, wherein the functionalized lignin is formed comprising carboxylic functional groups, is formed by a method comprising: a) providing a lignin having a plurality of hydroxyl groups; and b) non-selectively oxidizing at least one phenol group and/or primary hydroxyl group and/or secondary hydroxyl group to form at least one carboxylic functional group.

Aspect 89: The method of Aspect 84, wherein the functionalized lignin segment comprising carboxylic functional groups is formed by a method comprising: a) providing a lignin having a plurality of hydroxyl groups; and b) reacting the lignin with a dicarboxylic acid, a derivative of a dicarboxylic acid, or a combination thereof.

Aspect 90: The method of Aspect 89, wherein the functionalized lignin segment comprising carboxylic functional groups comprises two or more carboxylic groups.

Aspect 91: The method of Aspects 90, wherein the functionalized lignin segment comprising carboxylic functional groups comprises two carboxylic groups.

Aspect 92: The method of any one of Aspect 89-91, wherein the method of forming the functionalized lignin segment comprising reacting the lignin with a monocarboxylic acid prior to the step of reacting the lignin with the dicarboxylic acid, a derivative of a dicarboxylic acid, or a combination thereof.

Aspect 93: The method of Aspect 92, wherein the monocarboxylic acid reacts with one or more of the plurality of hydroxyl groups, thereby defining a number of the carboxylic groups present in the functionalized lignin segment comprising carboxylic functional groups.

Aspect 94: The method of any one of Aspects 89-93, wherein the dicarboxylic acid comprises succinic acid, sebacic acid, or a combination thereof.

Aspect 95: The method of any one of Aspects 92-94, wherein the monocarboxylic acid comprises acetic acid.

Aspect 96: The method of any one of Aspects 89-95, wherein the vegetable-oil based segment comprises castor oil.

Aspect 97: The method of any one of Aspects 89-95, wherein the vegetable-oil based segment is formed by a method comprising: an organic base-catalyzed ring-opening polymerization (ROP) of a vegetable-oil based lactone to form an opened ring linear lactone derivative.

Aspect 98: The method of Aspect 97, wherein the vegetable-oil based lactone comprises ethylene brassylate.

Aspect 99: The method of Aspect 97 or 98, wherein the ROP occurs in the presence of a catalyst.

Aspect 100: The method of any one of Aspects 97-99, wherein the ROP occurs in the presence of a catalytic accelerator.

Aspect 101: The method of any one of Aspects 97-100, wherein the ROP occurs in the presence of an initiator.

Aspect 102: The method of any one of Aspects 99-10, wherein the catalyst comprises dodecylbenzenesulfonic acid, diphenyl phosphate, p-toluensulfonic acid, 1,5,7-triazabicyclo[4.4.0]dec-5ne (TBD), 1,2,3-tricyclohexylguanidine, 1,2,3-triisopropylguanidine, or any combination thereof.

Aspect 103: The method of Aspect 101 or 102, wherein the initiator and the catalyst are the same and comprise TBD.

Aspect 104: The method of Aspect 103, wherein a ratio of TBD and ethylene brassylate is from about 1:1 to about 1:100.

Aspect 105: The method of any one of Aspects of 100-104, wherein the catalytic accelerator comprises $MgX_2$ based Lewis acid, wherein X is Cl, Br, or F.

Aspect 106: The method of any one of Aspects 98-105, wherein the opened ring linear lactone derivative comprises polyethylene brassylate.

Aspect 107: The method of any one of Aspects 102-103 or 106, wherein the initiator is a dialcohol.

Aspect 108: The method of Aspect 107, wherein the dialcohol initiator is derived from biomass.

Aspect 109: The method of any one of Aspect 84-108, wherein the step of forming the biodegradable polyester polymer comprises a condensation polymerization of the functionalized lignin comprising carboxylic functional groups with the formed vegetable-oil based segment to form the ester linkages between the lignin-containing segment and the vegetable oil-based segment Aspect 110: The method of Aspect 109, wherein the ester linkages comprise an alkyl ester linkage, aryl ester linkage, or a combination thereof.

Aspect 111: The method of any one of Aspects 109-110, wherein the step of the condensation polymerization occurs in the presence of a polymerization catalyst.

Aspect 112: The method of Aspect 111, wherein the polymerization catalyst comprises $Sb_2O_3$, $Sb_2O_5$, antimony acetate, or any combination thereof.

Aspect 113: The method of Aspect 111, wherein the polymerization catalyst comprises a nucleophilic catalyst.

Aspect 114: The method of Aspect 113, wherein the nucleophilic catalyst comprises 4-dimethylaminopyridine (DMAP).

Aspect 115: The method of any one of Aspects 113-114, further comprising a coupling agent.

Aspect 116: The method of Aspects 115, wherein the coupling agent is N,N'-dicyclohexylcarbodiimide (DCC).

Aspect 117: The method of any one of Aspects 84-109, wherein the step of forming the biodegradable polyester polymer comprises blending the functionalized lignin comprising carboxylic functional groups and the vegetable-oil based segment at a temperature above the melting point of the functionalized lignin comprising carboxylic functional groups and the vegetable-oil based segment.

Aspect 118: The method of any one of Aspects 85-117, wherein the biodegradable polyester polymer has a linear or a double networked molecular structure.

Aspect 119: The method of Aspect 118, wherein to form the biodegradable polyester polymer having the double networked molecular structure, the step of polymerizing comprises an interpenetrating polymer network preparation step.

Aspect 120: The method of Aspect 85, wherein the interpenetrating polymer network preparation step comprises dissolving the carboxylic acid functionalized lignin monomer within the dialcohol-containing polymer and then polymerizing the carboxylic acid functionalized lignin monomer within the dialcohol-containing polymer.

Aspect 121: The method of Aspect 855, the interpenetrating polymer network preparation step comprises dissolving the dialcohol-containing monomer within the carboxylic acid functionalized lignin polymer and then polymerizing the dialcohol-containing monomer within the carboxylic acid functionalized lignin polymer.

Aspect 122: The method of any one of Aspects 84-121, wherein a ratio of the functionalized lignin-containing segment and the vegetable-oil based segment is from 1:1 to 1:5 based on a weight percent of the polymer.

Aspect 123: The method of any one of Aspects 54-122, wherein the biodegradable polyester polymer exhibits a glass transition temperature ($T_g$) from about −30° C. to about 70° C. and a melting point ($T_m$) from about 70° C. to about 280° C.

Aspect 124: The method of Aspect 123, wherein the biodegradable polyester polymer exhibits $T_g$ of about 65° C. and $T_m$ of about 78° C.

Aspect 125: The method of Aspect 124, wherein the biodegradable polyester polymer exhibits a crystallinity temperature ($T_c$) of about 55° C.

Aspect 126: The method of Aspect 123, wherein the biodegradable polyester polymer exhibits $T_g$ of about −10° C. and $T_m$ of about 177° C.

Aspect 127: The method of Aspect 123, wherein the biodegradable polyester polymer exhibits $T_g$ of about 67° C. and $T_m$ of about 265° C.

Aspect 128: The method of any one of Aspects 84-127, wherein the biodegradable polyester polymer exhibits Young's modulus from about 0.1 to about 3.0 GPa as measured according to ASTM E111.

Aspect 129: The method of Aspect 128, wherein the biodegradable polyester polymer exhibits Young's modulus from about 0.1 to about 0.5 GPa as measured according to ASTM E111.

Aspect 130: The method of any one of Aspects 84-129, wherein the biodegradable polyester polymer exhibits a maximum tensile strength of about 0.5 to about 60 MPa as measured according to ASTM D638.

Aspect 131: The method of Aspect 130, wherein the biodegradable polyester polymer exhibits a maximum tensile strength of about 0.5 to about 10 MPa as measured according to ASTM D638.

Aspect 132: The method of any one of Aspects 84-131, wherein the biodegradable polyester polymer exhibits an elongation from about 80% to about 150% as measured according to ASTM D638.

Aspect 133: The method of any one of Aspects 84-132, wherein the method further comprises adding a filler to the biodegradable polyester polymer.

Aspect 134: The method of Aspect 133, wherein the filler comprises talc, magnesium oxide, clay, or a combination thereof.

Aspect 135: The method of any one of Aspects 84-134, further comprising forming the biodegradable polyester polymer into a predetermined shape.

Aspect 136: The method of any one of Aspects 84-134, further comprising forming extruding the biodegradable polyester polymer into a fiber.

Aspect 137: The method of any one of Aspects 84-136, further comprising forming an article comprising the biodegradable polyester polymer.

Aspect 138: The method of Aspect 137, wherein the article comprises packaging, food packaging, disposable cutlery, tableware, film, bags, nets, or any combination thereof.

REFERENCES (1) Van Franeker, J. A.; Law, K. L. Seabirds, Gyres and Global Trends in Plastic Pollution. *Environ. Pollut.* 2015, 203, 89-96. https://doi.org/10.1016/j.envpol.2015.02.034.

(2) Kyrikou, I.; Briassoulis, D. Biodegradation of Agricultural Plastic Films: A Critical Review. *J. Polym. Environ.* 2007, 15 (2), 125-150. https://doi.org/10.1007/s10924-007-0053-8.

(3) Khalil, H. P. S. A.; Tye, Y. Y.; Saurabh, C. K.; Leh, C. P.; Lai, T. K.; Chong, E. W. N.; Fazita, M. R. N.; Hafiidz, J. M.; Banerjee, A.; Syakir, M. I. Biodegradable Polymer Films from Seaweed Polysaccharides: A Review on Cellulose as a Reinforcement Material. *Express Polym. Lett.* 2017, 11 (4), 244-265.

(4) Kumari, A.; Yadav, S. K.; Yadav, S. C. Biodegradable Polymeric Nanoparticles Based Drug Delivery Systems. *Colloids Surfaces B Biointerfaces* 2010, 75 (1), 1-18. https://doi.org/https://doi.org/10.1016/j.colsurfb.2009.09.001.

(5) Mangaraj, S.; Yadav, A.; Bal, L. M.; Dash, S. K.; Mahanti, N. K. Application of Biodegradable Polymers in Food Packaging Industry: A Comprehensive Review. *J. Packag. Technol. Res.* 2019, 3 (1), 77-96. https://doi.org/10.1007/s41783-018-0049-y.

(6) Scaffaro, R.; Maio, A.; Sutera, F.; Gulino, E. Ortunato; Morreale, M. Degradation and Recycling of Films Based on Biodegradable Polymers: A Short Review. *Polymers* (*Basel*). 2019, 11 (4). https://doi.org/10.3390/polym11040651.

(7) Kamthai, S.; Magaraphan, R. Thermal and Mechanical Properties of Polylactic Acid (PLA) and Bagasse Carboxymethyl Cellulose (CMCB) Composite by Adding Isosorbide Diesters. *AIP Conf. Proc.* 2015, 1664 (2015). https://doi.org/10.1063/1.4918424.

(8) Cameron, D. J. A.; Shaver, M. P. Aliphatic Polyester Polymer Stars: Synthesis, Properties and Applications in Biomedicine and Nanotechnology. *Chem. Soc. Rev.* 2011, 40 (3), 1761-1776. https://doi.org/10.1039/C0CS00091D.

(9) Lassalle, V.; Ferreira, M. L. PLA Nano- and Microparticles for Drug Delivery: An Overview of the Methods of Preparation. *Macromol. Biosci.* 2007, 7 (6), 767-783. https://doi.org/10.1002/mabi.200700022.

(10) González, E.; Shepherd, M. L.; Saunders, L.; Frey, W. M. Surface Functional Poly(Lactic Acid) Electrospun Nanofibers for Biosensor Applications. *Materials.* 2016. https://doi.org/10.3390/ma9010047.

(11) de Geus, M.; van der Meulen, I.; Goderis, B.; van Hecke, K.; Dorschu, M.; van der Werff, H.; Koning, C. E.; Heise, A. Performance Polymers from Renewable Monomers: High Molecular Weight Poly(Pentadecalactone) for Fiber Applications. *Polym. Chem.* 2010, 1 (4), 525-533. https://doi.org/10.1039/B9PY00360F.

(12) Liu, H.; Mohsin, N.; Kim, S.; Chung, H. Lignin, a Biomass Crosslinker, in a Shape Memory Polycaprolactone Network. *J. Polym. Sci. Part A Polym. Chem.* 2019, 57 (20), 2121-2130. https://doi.org/10.1002/pola.29483.

(13) Karuppuswamy, P.; Reddy Venugopal, J.; Navaneethan, B.; Luwang Laiva, A.; Ramakrishna, S. Polycaprolactone Nanofibers for the Controlled Release of Tetracycline Hydrochloride. *Mater. Lett.* 2015, 141, 180-186. https://doi.org/https://doi.org/10.1016/j.matlet.2014.11.044.

(14) Cabedo, L.; Luis Feijoo, J.; Pilar Villanueva, M.; Lagáron, J. M.; Giménez, E. Optimization of Biodegradable Nanocomposites Based on APLA/PCL Blends for Food Packaging Applications. In *Macromolecular Symposia*; Wiley Online Library, 2006; Vol. 233, pp 191-197.

(15) Pascual, A.; Sardón, H.; Ruipérez, F.; Gracia, R.; Sudam, P.; Veloso, A.; Mecerreyes, D. Experimental and Computational Studies of Ring-Opening Polymerization of Ethylene Brassylate Macrolactone and Copolymerization with ε-Caprolactone and TBD-Guanidine Organic Catalyst. *J. Polym. Sci. Part A Polym. Chem.* 2015, 53 (4), 552-561. https://doi.org/10.1002/pola.27473.

(16) Fernandez, J.; Amestoy, H.; Sardon, H.; Aguirre, M.; Varga, A. L.; Sarasua, J.-R. Effect of Molecular Weight on the Physical Properties of Poly (Ethylene Brassylate) Homopolymers. *J. Mech. Behav. Biomed. Mater.* 2016, 64, 209-219.

(17) Fernández, J.; Montero, M.; Etxeberria, A.; Sarasua, J.-R. Ethylene Brassylate: Searching for New Comonomers That Enhance the Ductility and Biodegradability of Polylactides. *Polym. Degrad. Stab.* 2017, 137, 23-34.

(18) Cama, G.; Mogosanu, D.-E.; Houben, A.; Dubruel, P. Synthetic Biodegradable Medical Polyesters: Poly-ε-Caprolactone. In *Science and Principles of Biodegradable and Bioresorbable Medical Polymers*; Elsevier, 2017; pp 79-105.

(19) Müller, S.; Uyama, H.; Kobayashi, S. Lipase-Catalyzed Ring-Opening Polymerization of Cyclic Diesters. *Chem. Lett.* 1999, 28 (12), 1317-1318. https://doi.org/10.1246/cl.1999.1317.

(20) Pascual, A.; Sardon, H.; Veloso, A.; Ruipérez, F.; Mecerreyes, D. Organocatalyzed Synthesis of Aliphatic Polyesters from Ethylene Brassylate: A Cheap and Renewable Macrolactone. *ACS Macro Lett.* 2014, 3 (9), 849-853. https://doi.org/10.1021/mz500401u.

(21) Crestini, C.; Lange, H.; Sette, M.; Argyropoulos, D. S. On the Structure of Softwood Kraft Lignin. *Green Chem.* 2017, 19 (17), 4104-4121. https://doi.org/10.1039/C7GC01812F.

(22) Zhao, W.; Xiao, L.; Song, G.; Sun, R.; He, L.; Singh, S.; Simmons, B. A.; Cheng, G. From Lignin Subunits to Aggregates: Insights into Lignin Solubilization. *Green Chem.* 2017, 19 (14), 3272-3281. https://doi.org/10.1039/C7GC00944E.

(23) Shuai, L.; Amiri, M. T.; Questell-Santiago, Y. M.; Héroguel, F.; Li, Y.; Kim, H.; Meilan, R.; Chapple, C.; Ralph, J.; Luterbacher, J. S. Formaldehyde Stabilization Facilitates Lignin Monomer Production during Biomass Depolymerization. *Science* (80-.). 2016, 354 (6310), 329-333. https://doi.org/10.1126/science.aaf7810.

(24) Liu, H.; Chung, H. Visible-Light Induced Thiol-Ene Reaction on Natural Lignin. *ACS Sustain. Chem. Eng.* 2017, 5 (10), 9160-9168. https://doi.org/10.1021/acssuschemeng.7b02065.

(25) Sen, S.; Patil, S.; Argyropoulos, D. S. Thermal Properties of Lignin in Copolymers, Blends, and Composites: A Review. *Green Chem.* 2015, 17 (11), 4862-4887.

(26) Pucciariello, R.; Villani, V.; Bonini, C.; D'Auria, M.; Vetere, T. Physical Properties of Straw Lignin-Based Polymer Blends. *Polymer* (*Guildf*). 2004, 45 (12), 4159-4169.

(27) Wang, Y.; Wang, X.; Xie, Y.; Zhang, K. Functional Nanomaterials through Esterification of Cellulose: A Review of Chemistry and Application. *Cellulose* 2018, 25 (7), 3703-3731. https://doi.org/10.1007/s10570-018-1830-3.

(28) Kubo, S.; Kadla, J. F. Hydrogen Bonding in Lignin: A Fourier Transform Infrared Model Compound Study. *Biomacromolecules* 2005, 6 (5), 2815-2821.

(29) Luong, N. D.; Binh, N. T. T.; Park, I.-K.; Lee, S. H.; Kim, D. S.; Lee, Y. S.; Lee, Y. K.; Kim, B. W.; Kim, K. H.; Yoon, H. K. Chemical and Rheological Characteristics of Thermally Stable Kraft Lignin Polycondensates Analyzed by Dielectric Properties. *BioResources* 2013, 8 (3), 4518-4532.

(30) Zhao, S.; Abu-Omar, M. M. Synthesis of Renewable Thermoset Polymers through Successive Lignin Modification Using Lignin-Derived Phenols. *ACS Sustain. Chem. Eng.* 2017, 5 (6), 5059-5066. https://doi.org/10.1021/acssuschemeng.7b00440.

(31) Laurichesse, S.; Averous, L.; Avérous, L. Chemical Modification of Lignins: Towards Biobased Polymers.

*Prog. Polym. Sci.* 2014, 39 (7), 1266-1290. https://doi.org/https://doi.org/10.1016/j.progpolymsci.2013.11.004.
(32) Liu, H.; Chung, H. Self-Healing Properties of Lignin-Containing Nanocomposite: Synthesis of Lignin-Graft-Poly(5-Acetylaminopentyl Acrylate) via RAFT and Click Chemistry. *Macromolecules* 2016, 49 (19), 7246-7256. https://doi.org/10.1021/acs.macromol.6b01028.
(33) Pascual, A.; Leiza, J. R.; Mecerreyes, D. Acid Catalyzed Polymerization of Macrolactones in Bulk and Aqueous Miniemulsion: Ring Opening vs. Condensation. *Eur. Polym. J.,* 2013, 49 (6), 1601-1609. https://doi.org/10.1016/j.eurpolymj.2013.02.009.
(34) Balakshin, M. Y.; Capanema, E. A.; Santos, R. B.; Chang, H. M.; Jameel, H. Structural Analysis of Hardwood Native Lignins by Quantitative 13C NMR Spectroscopy. *Holzforschung* 2016, 70 (2), 95-108. https://doi.org/10.1515/hf-2014-0328.
(35) Rafiee, M.; Alherech, M.; Karlen, S. D.; Stahl, S. S. Electrochemical Aminoxyl-Mediated Oxidation of Primary Alcohols in Lignin to Carboxylic Acids: Polymer Modification and Depolymerization. *J. Am. Chem. Soc.* 2019, 141 (38), 15266-15276. https://doi.org/10.1021/jacs.9b07243.
(36) Yue, P. P.; Hu, Y. J.; Fu, G. Q.; Sun, C. X.; Li, M. F.; Peng, F.; Sun, R. C. Structural Differences between the Lignin-Carbohydrate Complexes (LCCs) from 2- and 24-Month-Old Bamboo (Neosinocalamus Affinis). *Int. J. Mol. Sci.* 2018, 19 (1), 1-14. https://doi.org/10.3390/ijms19010001.
(37) Fried, J. R. *Polymer Science and Technology*; Pearson Education, 2014.
(38) Liu, H.; Chung, H. Self-Healing Properties of Lignin-Containing Nanocomposite: Synthesis of Lignin-Graft-Poly(5-Acetylaminopentyl Acrylate) via RAFT and Click Chemistry. *Macromolecules* 2016, 49 (19), 7246-7256. https://doi.org/10.1021/acs.macromol.6b01028.
(39) *Polymer Handbook*/Editors, J. Brandrup, E. H. Immergut, and E. A. Grulke; Associate Editors, A. Abe, D. R. Bloch., 4th ed.; Brandrup, J., Immergut, E. H., Grulke, E. A., Eds.; Wiley: New York, 1999.
(40) Yan, J. J.; Kristufek, T.; Schmitt, M.; Wang, Z. Y.; Xie, G. J.; Dang, A.; Hui, C. M.; Pietrasik, J.; Bockstaller, M. R.; Matyjaszewski, K. Matrix-Free Particle Brush System with Bimodal Molecular Weight Distribution Prepared by SI-ATRP. *Macromolecules* 2015, 48 (22), 8208.
(41) Choi, J.; Hui, C. M.; Pietrasik, J.; Dong, H. C.; Matyjaszewski, K.; Bockstaller, M. R. Toughening Fragile Matter: Mechanical Properties of Particle Solids Assembled from Polymer-Grafted Hybrid Particles Synthesized by ATRP. *Soft Matter* 2012, 8 (15), 4072.
(42) Young, R. J.; Lovell, P. A. *Introduction to Polymers,* 3rd ed.; Polymer science; Taylor & Francis: Boca Raton, Fla., USA, 2011.
(43) Petisco-Ferrero, S.; Fernández, J.; Fernández San Martin, M. M. M.; Santamaria Ibarburu, P. A. A.; Sarasua Oiz, J. R. R. The Relevance of Molecular Weight in the Design of Amorphous Biodegradable Polymers with Optimized Shape Memory Effect. *J. Mech. Behav. Biomed. Mater.* 2016, 61, 541-553. https://doi.org/10.1016/j.jmbbm.2016.04.027.
(44) Fernández, J.; Amestoy, H.; Sardon, H.; Aguirre, M.; Varga, A. L.; Sarasua, J. R. Effect of Molecular Weight on the Physical Properties of Poly(Ethylene Brassylate) Homopolymers. *J. Mech. Behav. Biomed. Mater.* 2016, 64, 209-219. https://doi.org/10.1016/j.jmbbm.2016.07.031.

What is claimed is:

1. A method comprising:

a) providing a functionalized lignin segment comprising carboxylic functional groups;

b) providing a vegetable-oil based segment; and c) forming a biodegradable polyester polymer by forming ester linkages between the functionalized lignin segment and the vegetable-oil based segment;

wherein the functionalized lignin segment comprising carboxylic functional groups is formed by a method comprising:

a) providing a lignin having a plurality of hydroxyl groups; and b) reacting the lignin with a dicarboxylic acid, a derivative of a dicarboxylic acid, or a combination thereof; and wherein the vegetable-oil based segment is formed by a method comprising an organic base-catalyzed ring-opening polymerization (ROP) of a vegetable-oil based lactone to form an opened ring linear lactone derivative, wherein the ROP occurs in the presence of:

i) a catalyst; and/or ii) a catalytic accelerator; and/or iii) an initiator.

2. The method of claim 1, wherein the method of forming the functionalized lignin segment comprises reacting the lignin with a monocarboxylic acid prior to the step of reacting the lignin with the dicarboxylic acid, a derivative of a dicarboxylic acid, or a combination thereof.

3. The method of claim 1, wherein the vegetable-oil based segment comprises castor oil.

4. The method of claim 1, wherein the catalyst comprises dodecylbenzenesulfonic acid, diphenyl phosphate, p-toluensulfonic acid, 1,5,7-triazabicyclo [4.4.0]dec-5ne (TBD), 1,2,3-tricyclohexylguanidine, 1,2,3-triisopropylguanidine, or any combination thereof.

5. The method of claim 1, wherein the initiator and the catalyst are the same and comprise 1,5,7-triazabicyclo [4.4.0]dec-5ne (TBD).

6. The method of claim 5, wherein a ratio of TBD and the vegetable-oil based lactone is from about 1:1 to about 1:100.

7. The method of claim 1, wherein the catalytic accelerator comprises a $MgX_2$ based Lewis acid, wherein X is Cl, Br, or F.

8. The method of claim 1, wherein the opened ring linear lactone derivative comprises polyethylene brassylate.

9. The method of claim 1, wherein the initiator is a dialcohol.

10. The method of claim 1, wherein the step of forming the biodegradable polyester polymer comprises a condensation polymerization of the functionalized lignin comprising carboxylic functional groups with the formed vegetable-oil based segment to form the ester linkages between the lignin-containing segment and the vegetable oil-based segment, and wherein the step of the condensation polymerization occurs in the presence of a polymerization catalyst.

11. The method of claim 10, wherein the polymerization catalyst comprises $Sb_2O_3$, $Sb_2O_5$, antimony acetate, or any combination thereof; or wherein the polymerization catalyst comprises a nucleophilic catalyst comprising 4-dimethylaminopyridine (DMAP).

12. The method of claim 11, wherein when the catalyst is the nucleophilic catalyst comprising 4-dimethylaminopyridine (DMAP), the method further comprises a coupling agent comprising N'-dicyclohexylcarbodiimide (DCC).

13. The method of claim 1, wherein the step of forming the biodegradable polyester polymer comprises blending the functionalized lignin comprising carboxylic functional groups and the vegetable-oil based segment at a temperature above the melting point of the functionalized lignin comprising carboxylic functional groups and the vegetable-oil based segment.

14. The method of claim 1, wherein the biodegradable polyester polymer has a linear or a double networked molecular structure, and wherein to form the biodegradable polyester polymer having the double networked molecular structure, the step of polymerizing comprises an interpenetrating polymer network preparation step.

15. The method of claim 14, wherein the interpenetrating polymer network preparation step comprises dissolving the carboxylic acid functionalized lignin monomer within the dialcohol-containing polymer and then polymerizing the carboxylic acid functionalized lignin monomer within the dialcohol-containing polymer or the interpenetrating polymer network preparation step comprises dissolving the dialcohol-containing monomer within the carboxylic acid functionalized lignin polymer and then polymerizing the dialcohol-containing monomer within the carboxylic acid functionalized lignin polymer.

16. The method of claim 1, wherein a ratio of the functionalized lignin-containing segment and the vegetable-oil based segment is from 1:1 to 1:5 based on a weight percent of the polymer.

17. The method of claim 1, further comprising forming an article comprising the biodegradable polyester polymer, and wherein the article comprises a packaging, food packaging, disposable cutlery, tableware, film, bags, nets, or any combination thereof.

* * * * *